(12) United States Patent
Omote et al.

(10) Patent No.: US 7,060,320 B1
(45) Date of Patent: Jun. 13, 2006

(54) TRANSPARENT CONDUCTIVE FILM FOR TRANSPARENT TOUCH PANEL, TRANSPARENT TOUCH PANEL USING TRANSPARENT CONDUCTIVE FILM, AND METHOD OF MANUFACTURING TRANSPARENT CONDUCTIVE FILM

(75) Inventors: Ryoumei Omote, Kyoto (JP); Yoshihide Inako, Kyoto (JP); Yosuke Matsukawa, Kyoto (JP); Masayasu Sakane, Kyoto (JP); Kazuhiro Nishikawa, Kyoto (JP)

(73) Assignee: Nissha Printing Co., Ltd., Kyoto (JP)

( * ) Notice: Subject to any disclaimer, the term of this patent is extended or adjusted under 35 U.S.C. 154(b) by 0 days.

(21) Appl. No.: 09/486,890

(22) PCT Filed: Jul. 6, 1999

(86) PCT No.: PCT/JP99/03654

§ 371 (c)(1),
(2), (4) Date: May 26, 2000

(87) PCT Pub. No.: WO00/02119

PCT Pub. Date: Jan. 13, 2000

(30) Foreign Application Priority Data

Jul. 6, 1998 (JP) .................................. 10-189542

(51) Int. Cl.
*B05D 5/02* (2006.01)
*B05D 5/12* (2006.01)
*B05D 1/28* (2006.01)

(52) U.S. Cl. ................. 427/108; 427/126.1; 427/126.2; 427/164; 427/165; 428/1.4; 428/141; 428/432; 428/697; 428/702

(58) Field of Classification Search ................. 428/1.4, 428/141, 143, 144, 148, 432, 697, 702; 427/108, 427/126.1, 126.2, 164, 165
See application file for complete search history.

(56) References Cited

U.S. PATENT DOCUMENTS

| 4,448,637 | A | * | 5/1984 | Hiraishi et al. ................ 216/23 |
| 4,675,469 | A | * | 6/1987 | Iida et al. .................... 136/256 |
| 4,847,625 | A | * | 7/1989 | Dietrich et al. ...... 343/700 MS |
| 5,225,273 | A | * | 7/1993 | Mikoshiba et al. ......... 428/323 |
| 5,411,792 | A | | 5/1995 | Yukinobu et al. ........... 428/212 |
| 5,421,926 | A | | 6/1995 | Yukinobu et al. ............. 156/83 |

(Continued)

FOREIGN PATENT DOCUMENTS

JP  60-174126  11/1985

(Continued)

*Primary Examiner*—Terrel Morris
*Assistant Examiner*—Andrew T. Piziali
(74) *Attorney, Agent, or Firm*—Wenderoth, Lind & Ponack, L.L.P.

(57) ABSTRACT

In a transparent conductive film for use in a transparent touch panel in which a lower electrode and an upper electrode are stacked so as to be spaced from each other by spacers, the transparent conductive film being provided on an electrode substrate of at least one of the electrodes and thereby forming the electrode, the transparent conductive film has, in its surface shape, an arithmetic mean roughness (Ra) within a range of $0.4\ \mathrm{nm} \leq Ra \leq 4.0\ \mathrm{nm}$ and a root-mean-square roughness (Rms) within a range of $0.6\ \mathrm{nm} \leq Rms \leq 3.0\ \mathrm{nm}$.

3 Claims, 12 Drawing Sheets

U.S. PATENT DOCUMENTS

| | | | | |
|---|---|---|---|---|
| 5,477,783 A | * | 12/1995 | Hashimura | 101/158 |
| 6,089,154 A | * | 7/2000 | Masaki et al. | 101/153 |
| 6,217,995 B1 | * | 4/2001 | Handa | 264/1.24 |
| 6,284,393 B1 | * | 9/2001 | Hosokawa et al. | 428/690 |
| 6,351,068 B1 | * | 2/2002 | Yamazaki et al. | 313/506 |

FOREIGN PATENT DOCUMENTS

| | | |
|---|---|---|
| JP | 5-325646 | 12/1993 |
| JP | 9-305313 | 11/1997 |
| JP | 10-24516 | 1/1998 |

* cited by examiner

AGGREGATE    CRYSTAL GRAIN

TRANSPARENT CONDUCTIVE FILM FOR TRANSPARENT TOUCH PANEL, TRANSPARENT TOUCH PANEL USING TRANSPARENT CONDUCTIVE FILM, AND METHOD OF MANUFACTURING TRANSPARENT CONDUCTIVE FILM

TECHNICAL FIELD

The present invention relates to a transparent conductive film for use in a transparent touch panel capable of performing stable, light touch inputs, to a transparent touch panel using the transparent conductive film, and to a method for fabricating a transparent conductive film. The transparent conductive film for use in a transparent touch panel, the transparent touch panel using the transparent conductive film, and the method for fabricating a transparent conductive film, according to the present invention are particularly suitable as a transparent conductive film for use in a transparent touch panel to be used as an input device by being laminated on a display screen of a flat display such as liquid crystal display devices, electroluminescent elements, plasma display devices, fluorescent character display tables, and field emission displays, and as a transparent touch panel using the transparent conductive film, and as a method for fabricating a transparent conductive film.

BACKGROUND ART

The transparent conductive film to be used as an electrode in a transparent touch panel is generally made of a metallic oxide such as ATO (antimony oxide/tin oxide), FTO (tin oxide/fluorine dope), ITO (indium oxide/tin oxide), FATO (antimony oxide/tin oxide/fluorine dope), or the like. Among others, the resistor-film analog type transparent touch panel is required to have a surface resistance of 200–2000 Ω/sq and be highly transparent and less colored.

The resistor-film analog type transparent touch panel has such a structure that a lower electrode substrate comprising an insulating substrate such as a glass plate or a film having on its surface a lower electrode made of a transparent conductive film and dot-like spacers, and an upper electrode substrate comprising an insulating substrate such as a film having on its surface an upper electrode made of a transparent conductive film are laminated. The transparent touch panel is thus enabled to make an input by pressing a portion of the surface of the transparent touch panel from the input surface side so that the two electrodes are put into contact and electrically conducting with each other.

The transparent conductive film formed in the transparent touch panel is normally formed by a physical film formation process such as evaporation process and sputtering process or a chemical vapor phase process such as CVD process. In these processes, the mean crystal grain size (R) within a plane observed at the film surface of the transparent conductive film is controllable. For example, in the case of a physical film formation process, the mainstream is transparent conductive films made of ITO, where the surface resistance value is required to be 200–2000 Ω/sq, rather higher as compared with electrodes for liquid crystal displays. However, because ITO is low in specific resistance, it is necessary to increase the surface resistance value by forming an ultrathin film having a film thickness of about 100–200 Å.

Under these circumstances, because the transparent conductive film is provided as an ultrathin ITO film, the mean crystal grain size (R) is as fine as 10–5 nm, where the arithmetic mean roughness (Ra) as observed by an atomic force microscope is as small as 0.1–0.3 nm and the root-mean-square roughness (Rms) is as small as 0.25 nm. For example, a surface cross-section of a transparent conductive film is formed generally triangular of grains as shown in FIG. 5 and FIGS. 17 to 19.

Accordingly, in a transparent touch panel using such transparent conductive films, because mutually contacting cross sections of transparent conductive films are formed generally triangular of grains, the so-called light touch input that an input state can be held for a slight-load input becomes unstable. Further, in the case of successive inputs with an about 10 g load by using a pen or the like, there would occur frequently line breaks of continuous lines and mis-input portions as shown by A in FIG. 6 such that proper inputs could not be obtained.

Thus, in order to solve these phenomena, such countermeasures as widening the spacer distance or reducing the spacer height could be conceived.

However, widening the spacer distance would make it more likely to occur that mis-inputs happen upon contact of the palm or other events.

Also, reducing the spacer height would cause the distance between opposing electrode substrates to be so short that Newton's rings due to light interference would occur between the transparent conductive films, degrading the visibility.

As a further countermeasure, it is also possible that the threshold voltage Evs (see FIG. 7) that conditions ON/OFF state upon an input by the transparent touch panel is set low, thereby compensating a voltage reduction due to contact resistance developed between opposing electrodes for an easier input. However, this would make it likely to occur that even unstable inputs are accepted so that coordinate jumps would frequently occur, as an issue. That is, as shown in FIG. 7, in the case where the threshold voltage Evs is set to a low one as a countermeasure for the phenomenon that the detected voltage Ev (see FIG. 4) fluctuates up and down due to variations in the contact resistance value Eb, for example, where the threshold voltage is set to 3.6 V, if there have been two-place inputs of 4.0 V and 3.5 V simultaneously, such as upon a film contact due to improper strain or upon a finger-and-pen simultaneous contact where a finger contacts a portion near a pen-contact portion at the same time as the pen contacts there, it is decided as a mis-input so that no display is given on the liquid crystal display screen or the like, where a case that there are no coordinate inputs at the relevant portion, i.e., line breaks result (see FIG. 6).

Accordingly, an object of the present invention is to provide a transparent conductive film for use in a transparent touch panel capable of performing stable, light touch inputs, a transparent touch panel using the transparent conductive film, and a method for fabricating a transparent conductive film, by which the above-described issues can be solved.

DISCLOSURE OF INVENTION

In accomplishing these and other aspects, a transparent conductive film for use in a transparent touch panel according to a first aspect of the present invention is constructed so that a lower electrode and an upper electrode are stacked so as to be spaced from each other by spacers, the transparent conductive film being provided on an electrode substrate of at least one of the electrodes and thereby forming the electrode, wherein the transparent conductive film has, in its surface shape, an arithmetic mean roughness (Ra) within a range of 0.4 nm≦Ra≦4.0 nm and a root-mean-square roughness (Rms) within a range of 0.6 nm≦Rms≦3.0 nm.

A transparent conductive film for use in a transparent touch panel according to a second aspect of the present invention is constructed so that a lower electrode and an upper electrode are stacked so as to be spaced from each other by spacers, the transparent conductive film being provided on an electrode substrate of at least one of the electrodes and thereby forming the electrode, wherein the transparent conductive film is composed of an indium oxide-tin oxide film and a mean crystal grain size (R) within a plane of a metallic oxide observed at a surface of the transparent conductive film is within a range of 40 nm≦R≦200 nm.

A transparent conductive film for use in a transparent touch panel according to a third aspect of the present invention is constructed so that a lower electrode and an upper electrode are stacked so as to be spaced from each other by spacers, the transparent conductive film being provided on an electrode substrate of at least one of the electrodes and thereby forming the electrode, wherein the transparent conductive film is composed of a fluorine- or antimony-added tin oxide film and a mean crystal grain size (R) within a plane of a metallic oxide observed at a surface of the transparent conductive film is within a range of 80 nm≦R≦400 nm.

A transparent conductive film for use in a transparent touch panel according to a fourth aspect of the present invention, in the first or second aspect, is constructed so that the transparent conductive film is composed of an indium oxide-tin oxide film and has, in its surface shape, an arithmetic mean roughness (Ra) within a range of 0.4 nm≦Ra≦3.0 nm and a root-mean-square roughness (Rms) within a range of 0.6 nm≦Rms≦2.0 nm.

A transparent conductive film for use in a transparent touch panel according to a fifth aspect of the present invention, in the first or third aspect, is constructed so that the transparent conductive film is composed of a fluorine- or antimony-added tin oxide film and has, in its surface shape, an arithmetic mean roughness (Ra) within a range of 0.4 nm≦Ra≦4.0 nm and a root-mean-square roughness (Rms) within a range of 0.6 nm≦Rms≦3.0 nm.

A transparent conductive film for use in a transparent touch panel according to a sixth aspect of the present invention, in any one of the first to fifth aspects, is constructed so that given a center line depth Rp and a maximum roughness Rmax with respect to the surface shape, a parameter (Rp/Rmax) representing the surface shape is set to 0.55 or less, whereby a cross section of grain aggregates forming the surface shape is formed into a trapezoidal or rectangular shape.

A transparent conductive film for use in a transparent touch panel according to a seventh aspect of the present invention, in any one of the first to sixth aspects, is constructed so that the transparent conductive film is formed by a coating or printing process with a sol-gel material.

A transparent touch panel according to an eighth aspect of the present invention is constructed so that the transparent conductive film in any one of the first to seventh aspects is provided on an electrode substrate of at least one electrode out of the lower electrode and the upper electrode and thereby forming the electrode.

A transparent touch panel according to a ninth aspect of the present invention is constructed so that the transparent conductive film in any one of the first to seventh aspects is provided on electrode substrates of both the lower electrode and the upper electrode and thereby forming the electrodes.

A method for fabricating a transparent conductive film for use in a transparent touch panel according to a tenth aspect of the present invention is constructed so that a lower electrode and an upper electrode are stacked so as to be spaced from each other by spacers, the transparent conductive film being provided on an electrode substrate of at least one of the electrodes and thereby forming the electrode, the method comprising:

forming an indium oxide-tin oxide film so that the film has, in its surface shape, an arithmetic mean roughness (Ra) within a range of 0.4 nm≦Ra≦3.0 nm and a root-mean-square roughness (Rms) within a range of 0.6 nm≦Rms≦2.0 nm, by a coating or printing process using a sol-gel material, where at least an organometallic compound constituting the sol-gel material is composed of indium and tin and has a constituent weight ratio of indium to tin that 5 wt %≦{Sn/(In +Sn)}×100≦15 wt %.

A method for fabricating a transparent conductive film for use in a transparent touch panel according to an eleventh aspect of the present invention is constructed so that a lower electrode and an upper electrode are stacked so as to be spaced from each other by spacers, the transparent conductive film being provided on an electrode substrate of at least one of the electrodes and thereby forming the electrode, the method comprising:

forming an indium oxide-tin oxide film so that a mean crystal grain size (R) within a plane of a metallic oxide observed at a surface of the film is within a range of 40 nm≦R≦200 nm, by a coating or printing process using a sol-gel material, where at least an organometallic compound constituting the sol-gel material is composed of indium and tin and has a constituent weight ratio of indium to tin that 5 wt %≦{Sn/(In +Sn)}×100≦15 wt %.

A method for fabricating a transparent conductive film for use in a transparent touch panel according to a twelfth aspect of the present invention is constructed so that a lower electrode and an upper electrode are stacked so as to be spaced from each other by spacers, the transparent conductive film being provided on an electrode substrate of at least one of the electrodes and thereby forming the electrode, the method comprising:

after coating or printing with a sol-gel material by a coating or printing process using the sol-gel material, performing an initially drying process; then performing an oxidation burning process at a temperature increasing rate of 40° C.–60° C. per minute within a temperature range of 200° C.–400° C.; and subsequently performing a reduction burning process, thereby forming an indium oxide-tin oxide film so that the film has, in its surface shape, an arithmetic mean roughness (Ra) within a range of 0.4 nm≦Ra≦3.0 nm and a root-mean-square roughness (Rms) within a range of 0.6 nm≦Rms≦2.0 nm.

A method for fabricating a transparent conductive film for use in a transparent touch panel according to a thirteenth aspect of the present invention is constructed so that a lower electrode and an upper electrode are stacked so as to be spaced from each other by spacers, the transparent conductive film being provided on an electrode substrate of at least one of the electrodes and thereby forming the electrode, the method comprising:

after coating or printing with a sol-gel material by a coating or printing process using the sol-gel material, performing an initially drying process; then performing an oxidation burning process at a temperature increasing rate of 40° C.–60° C. per minute within a temperature range of 200° C.–400° C.; and subsequently performing a reduction burning process, thereby forming an indium oxide-tin oxide film so that a mean crystal grain size (R) within a plane of a metallic oxide observed at a surface of the film is within a range of 40 nm≦R≦200 nm.

A method for fabricating a transparent conductive film for use in a transparent touch panel according to a fourteenth aspect of the present invention, in the tenth or eleventh aspect, is constructed so that when the transparent conductive film is formed by the coating or printing process using the sol-gel material, the method comprising:

after coating or printing with the sol-gel material, performing an initially drying process; then performing an oxidation burning process at a temperature increasing rate of 40° C.–60° C. per minute within a temperature range of 200° C.–400° C.; and subsequently performing a reduction burning process, thereby forming the transparent conductive film.

A transparent conductive film for use in a transparent touch panel according to a fifteenth aspect of the present invention is constructed so that the film is fabricated by the method for fabricating a transparent conductive film for use in a transparent touch panel according to any one of the tenth to fourteenth aspects.

BRIEF DESCRIPTION OF DRAWINGS

These and other aspects and features of the present invention will become clear from the following description taken in conjunction with the preferred embodiments thereof with reference to the accompanying drawings, in which.

BEST MODE FOR CARRYING OUT THE INVENTION

Figure 1:
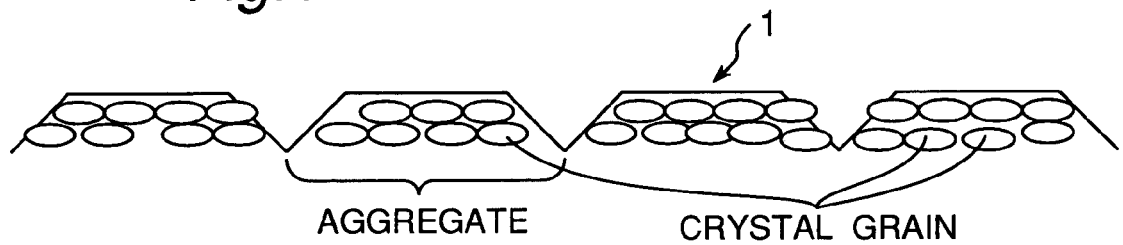
FIG. 1 is a schematic sectional view showing a cross-sectional shape of the surface of a transparent conductive film of a transparent touch panel according to an embodiment of the present invention.

Before the description of the present invention proceeds, it is to be noted that like parts are designated by like reference numerals throughout the accompanying drawings.

Embodiments of the present invention are described in detail with reference to the accompanying drawings.

Figure 3:
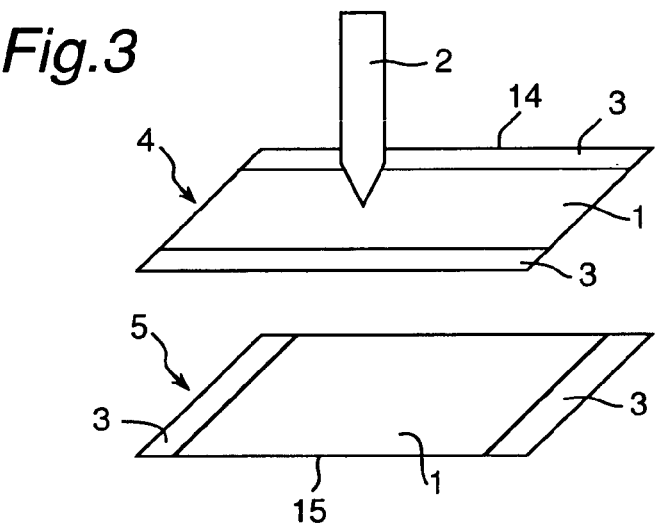
FIG. 3 is a perspective view showing a method for observing voltage drop due to contact resistance between the transparent conductive films of the transparent touch panel of the above embodiment.
Figure 4:
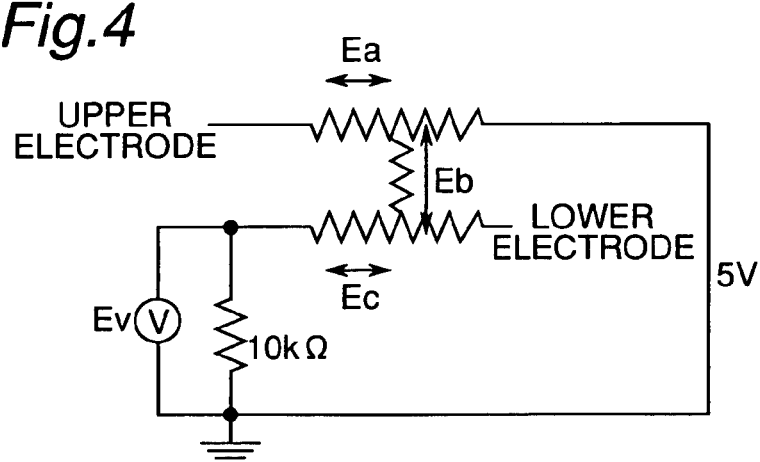
FIG. 4 is a circuit diagram showing a method for observing voltage drop due to contact resistance between the transparent conductive films of the transparent touch panel of the above embodiment.
Figure 2:
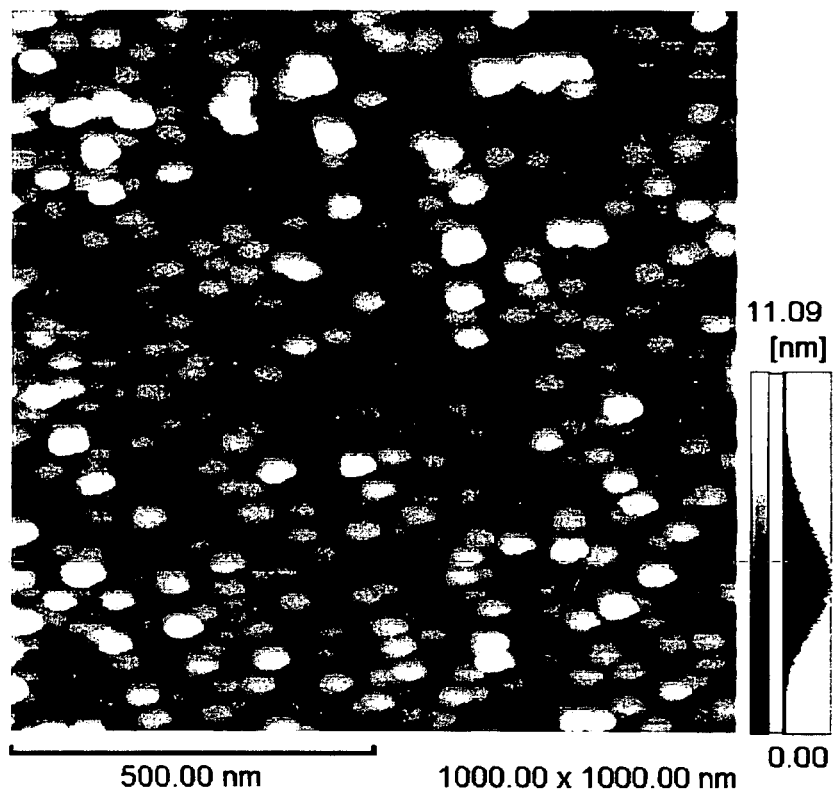
FIG. 2 is an atomic force microscope photograph showing crystal grain size of a metallic oxide of the transparent conductive film of the transparent touch panel of the above embodiment of the present invention.
Figure 13:
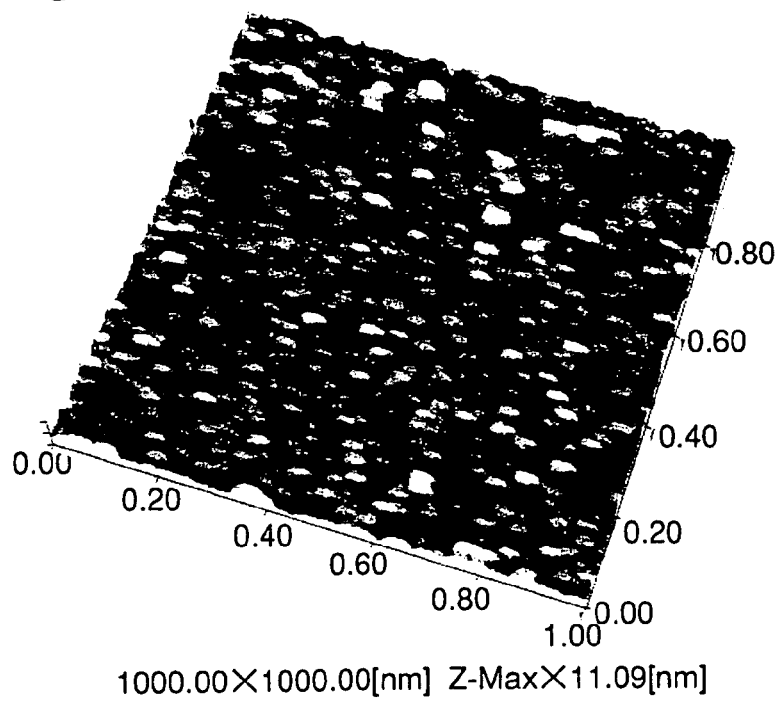
FIG. 13 is an atomic force microscope photograph showing crystal grain size of a metallic oxide of the transparent conductive film of the transparent touch panel of the above embodiment of FIG. 2.
Figure 5:
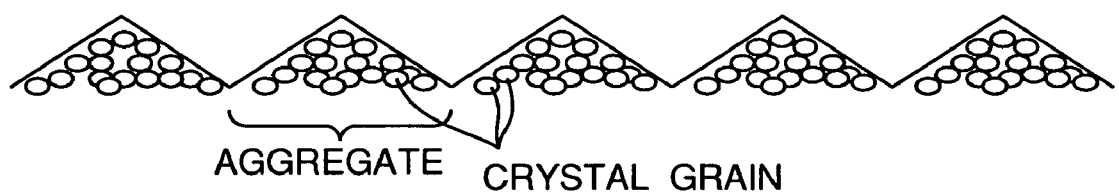
FIG. 5 is a schematic sectional view showing a cross-sectional shape of the surface of a transparent conductive film of a transparent touch panel according to the prior art.
Figure 6:
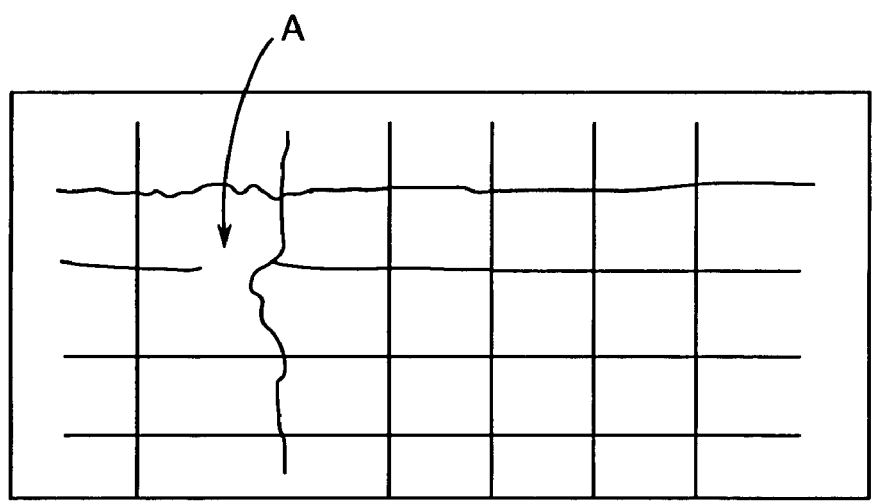
FIG. 6 is a line drawing representing trouble such as a line break that occurs when a continuous input is done with a light load on the transparent touch panel.
Figure 7:
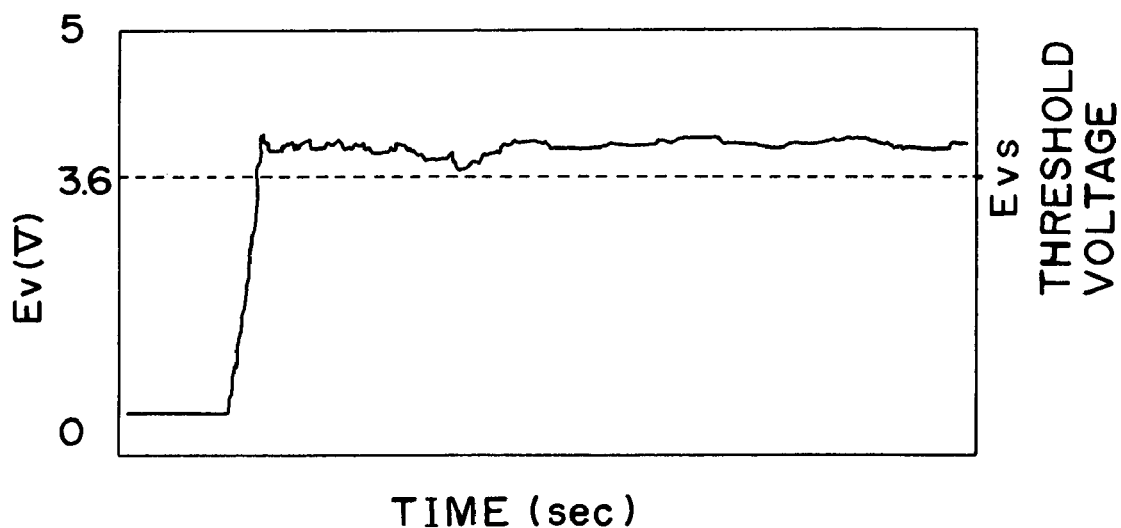
FIG. 7 is a schematic view in which input voltage Ev detected upon an input on the transparent touch panel of the above embodiment and threshold voltage Evs are recorded.
Figure 8:
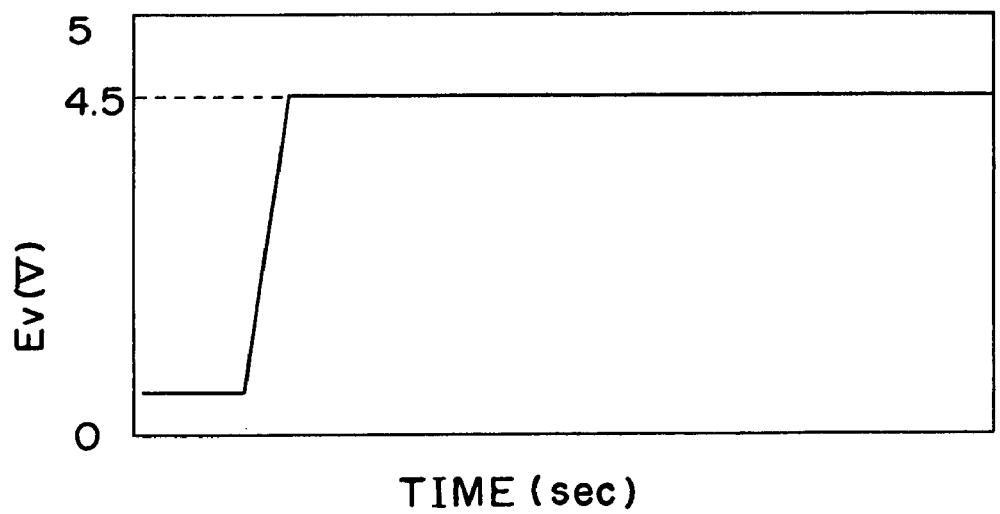
FIG. 8 is a schematic view in which an ideal input voltage Ev detected upon an input on the transparent touch panel of the above embodiment is recorded.
Figure 9:
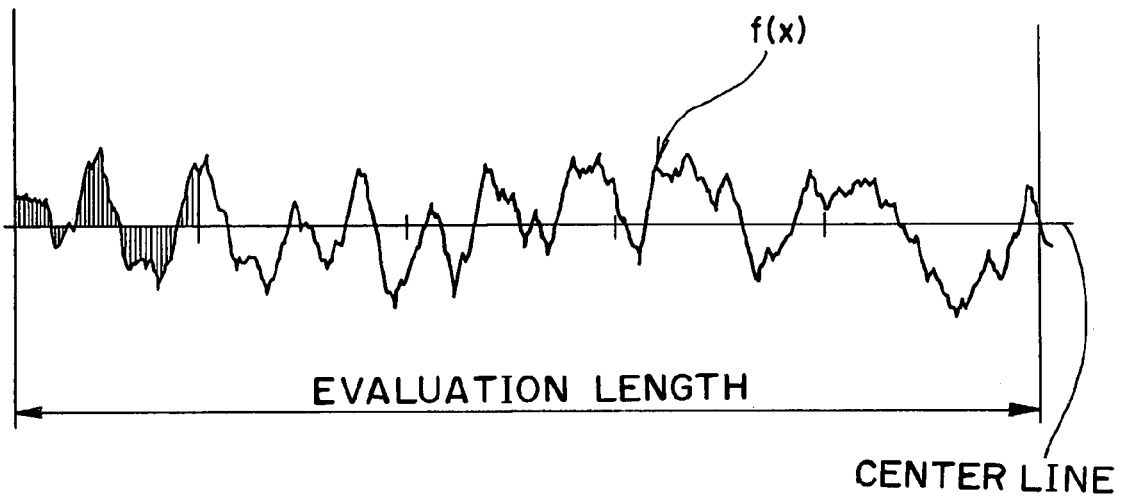
FIG. 9 is a graph for explaining the arithmetic mean roughness of a surface roughness parameter in the transparent touch panel of the above embodiment.
Figure 10:
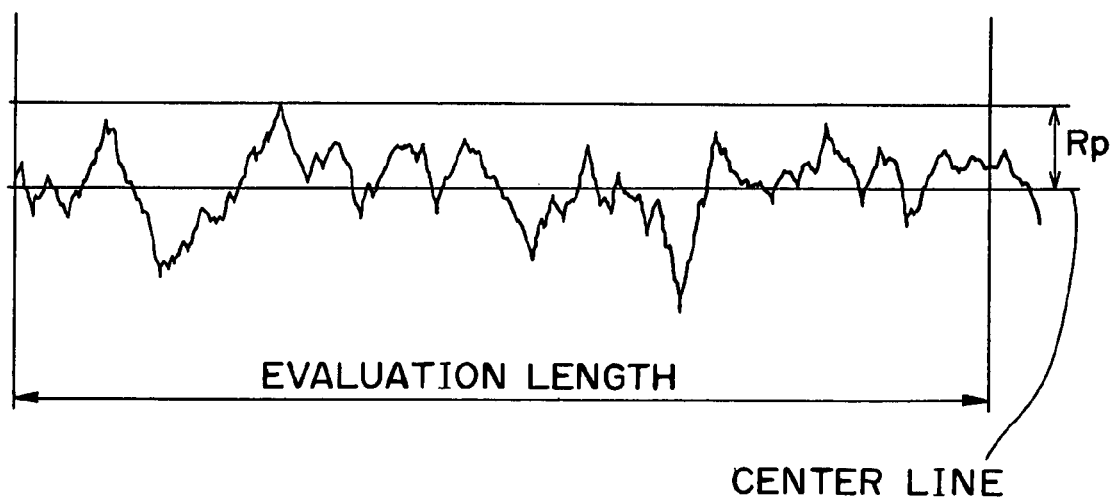
FIG. 10 is a graph for explaining the center line (average line) depth of a surface roughness parameter in the transparent touch panel of the above embodiment.
Figure 11:
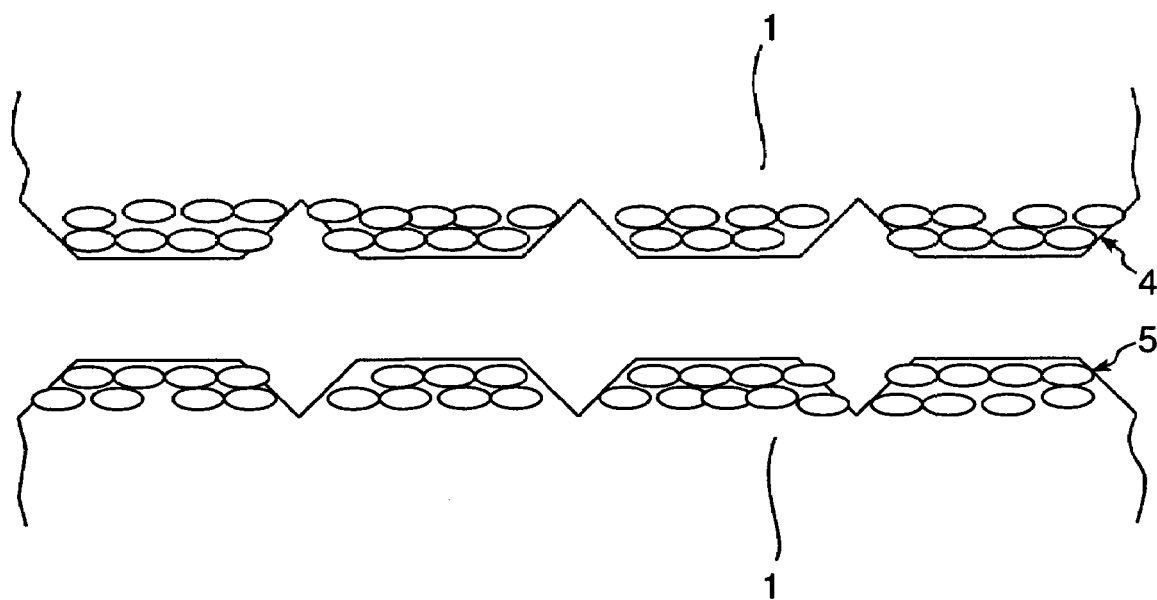
FIG. 11 is a schematic sectional view showing a cross-sectional shape of the surface of the transparent conductive film in the state that the upper electrode and the lower electrode of the transparent touch panel of the above embodiment are opposed to each other.
Figure 12:
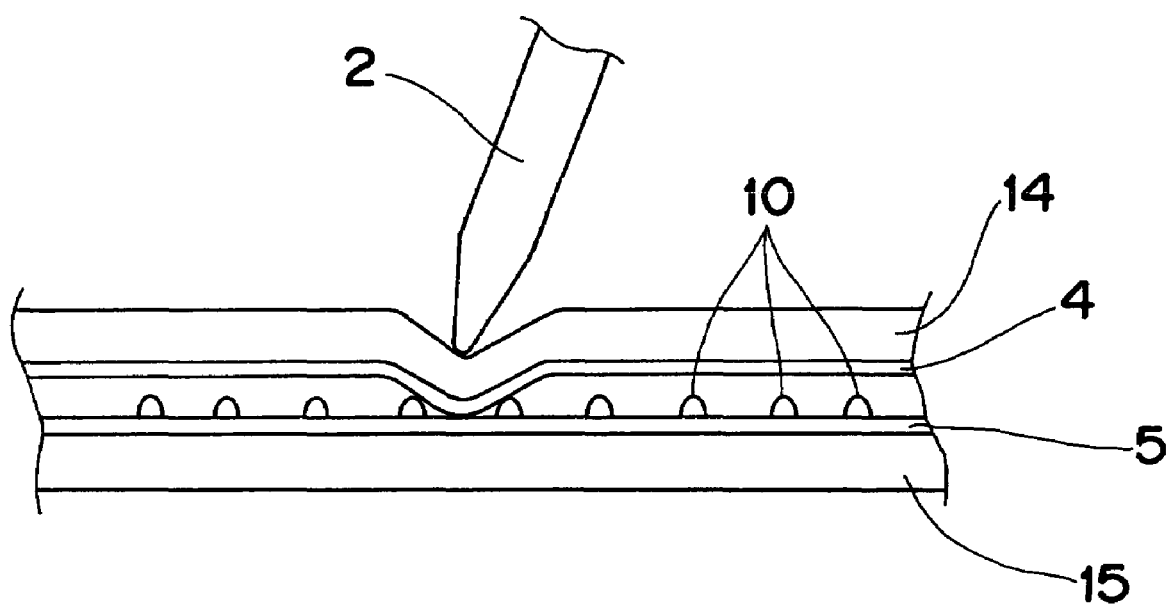
FIG. 12 is a schematic view showing a state of a pen input performed while the upper electrode and the lower electrode of the transparent touch panel of the above embodiment are opposed to each other.
Figure 14:
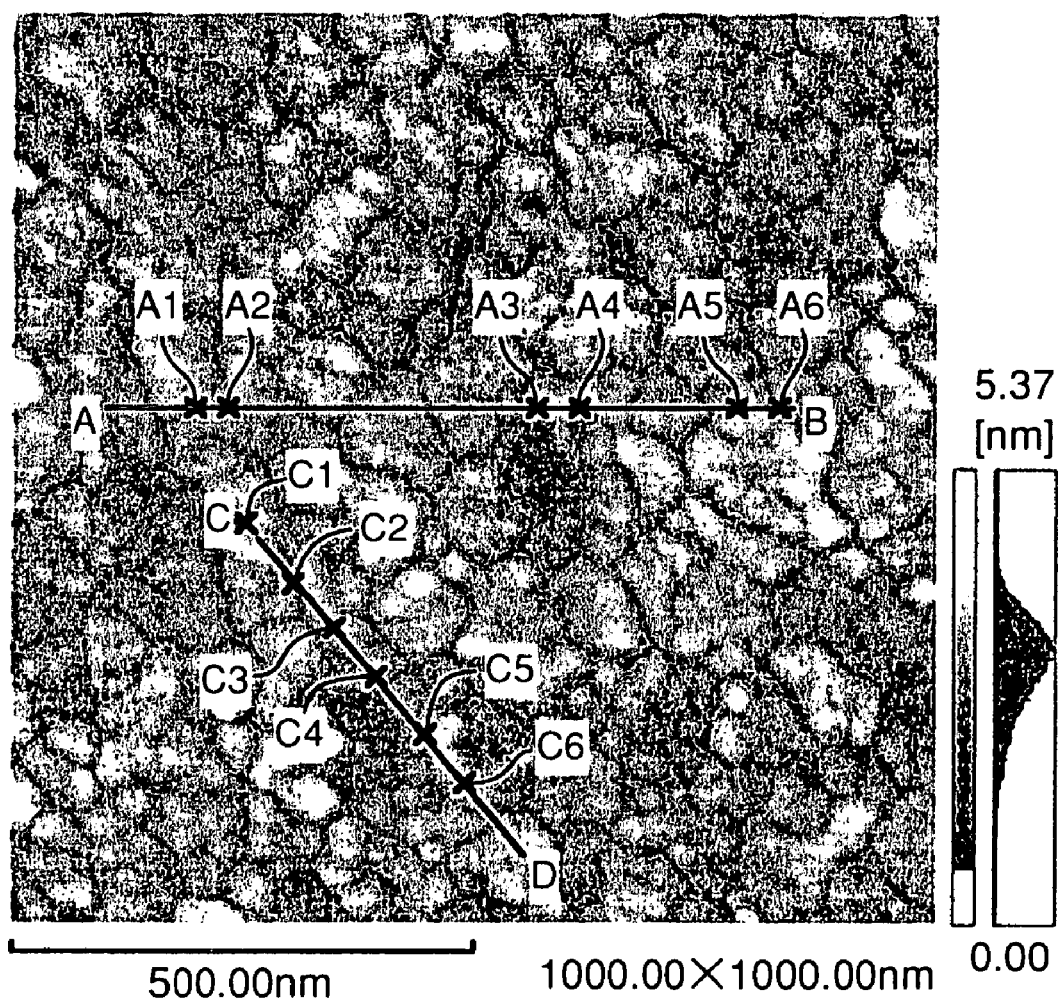
FIG. 14 is another atomic force microscope photograph showing crystal grain size of a metallic oxide of the transparent conductive film of the transparent touch panel of the above embodiment of the present invention.
Figure 15:
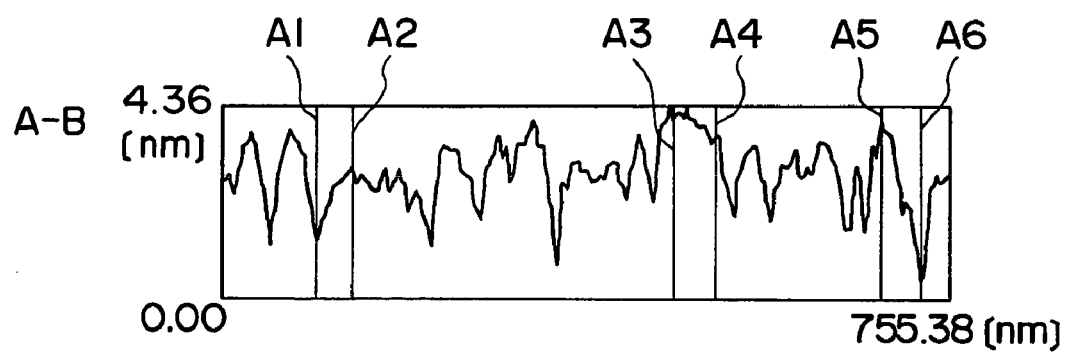
FIG. 15 is a graph showing heightwise variations in the crystal grain size of a metallic oxide of the transparent conductive film in a cross section taken along the line A-B of FIG. 14.
Figure 16:
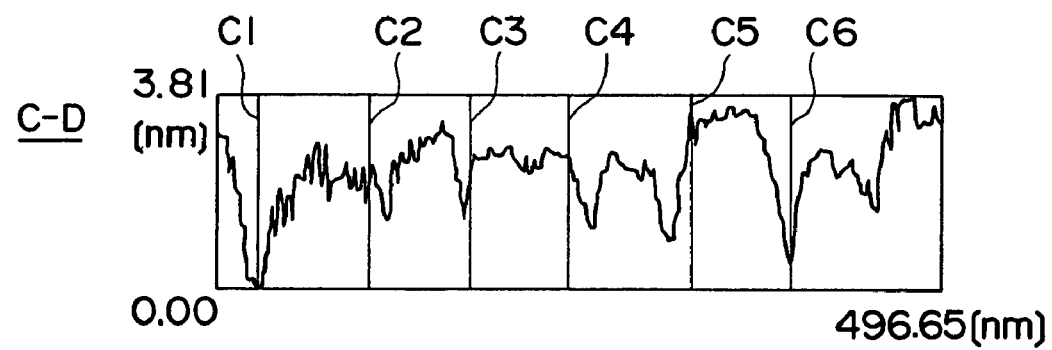
FIG. 16 is a graph showing heightwise variations in the crystal grain size of a metallic oxide of the transparent conductive film in a cross section taken along the line C-D of FIG. 14.
Figure 17:
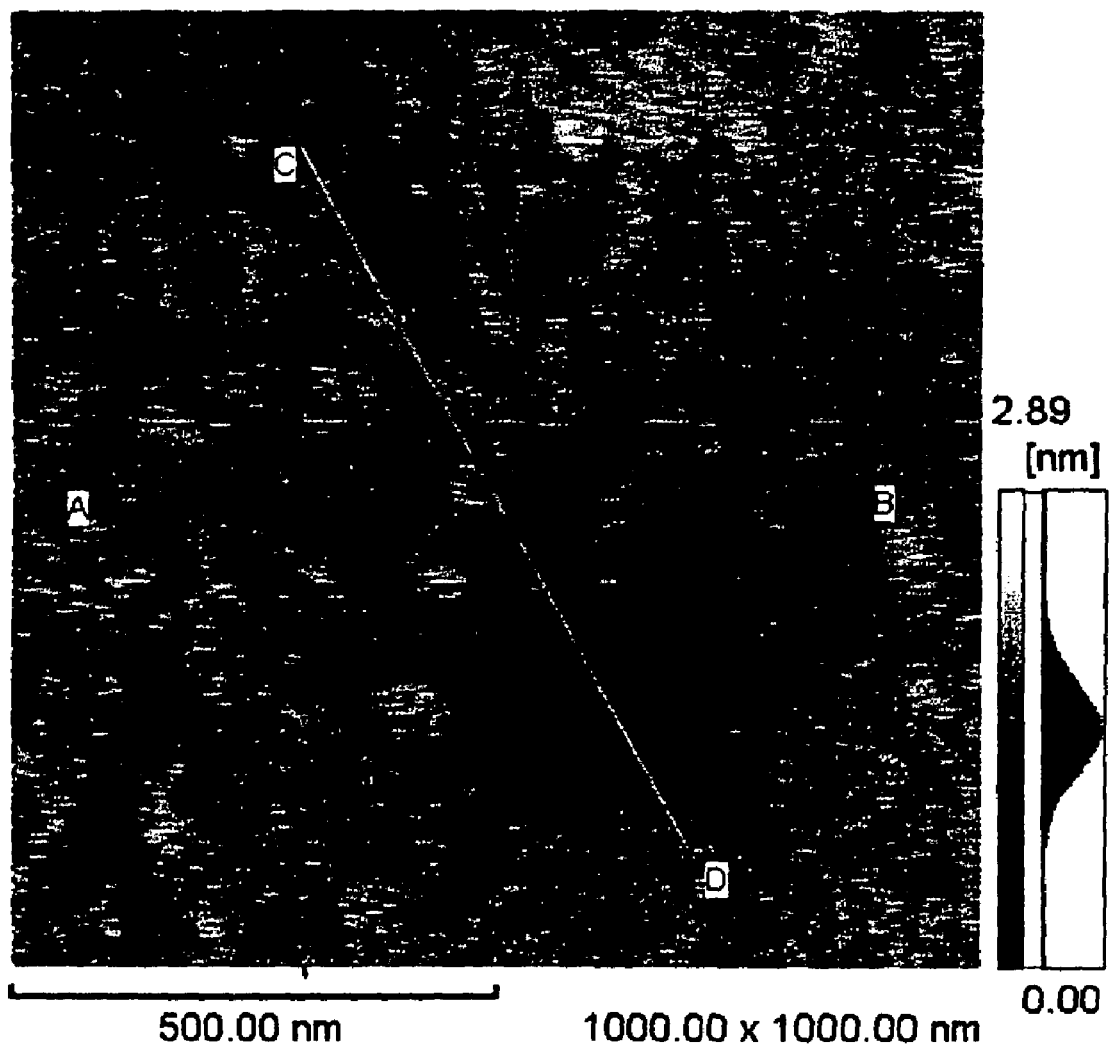
FIG. 17 is an atomic force microscope photograph showing crystal grain size of a metallic oxide of the transparent conductive film of the transparent touch panel of the prior art.
Figure 18:
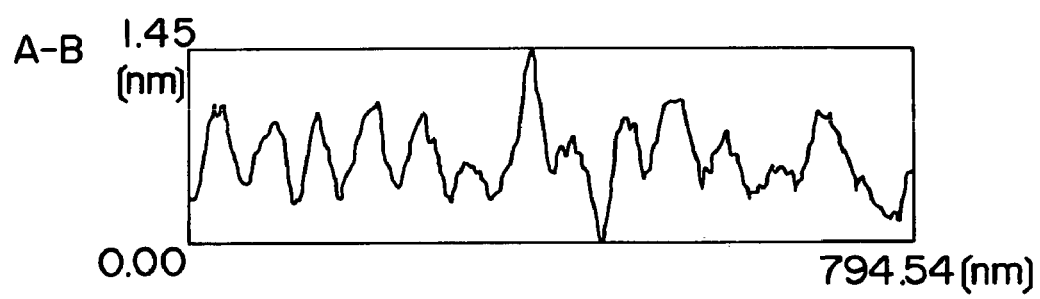
FIG. 18 is a graph showing heightwise variations in the crystal grain size of a metallic oxide of the transparent conductive film in a cross section taken along the line A-B of FIG. 17.
Figure 19:
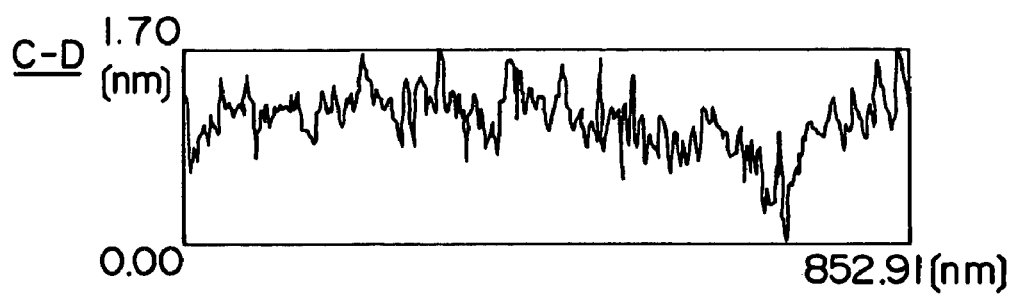
FIG. 19 is a graph showing heightwise variations in the crystal grain size of a metallic oxide of the transparent conductive film in a cross section taken along the line C-D of FIG. 17.

FIG. 1 is a schematic sectional view showing a cross-sectional shape of the surface of a transparent conductive film of a transparent touch panel according to an embodiment of the invention. FIG. 2 is an atomic force microscope photograph showing crystal grain size of a metallic oxide of the transparent conductive film of the transparent touch panel of the above embodiment of the invention. FIG. 3 is a perspective view showing a method for observing voltage drop due to contact resistance between the transparent conductive films of the transparent touch panel of the above embodiment. FIG. 4 is a circuit diagram showing a method for observing voltage drop due to contact resistance between the transparent conductive films of the transparent touch panel of the above embodiment. FIG. 8 is a schematic view in which an ideal input voltage Ev detected upon an input on the transparent touch panel of the above embodiment is recorded. FIG. 9 is a graph for explaining the arithmetic mean roughness of a surface roughness parameter in the transparent touch panel of the above embodiment. FIG. 10 is a graph for explaining the center line (average line) depth of a surface roughness parameter in the transparent touch panel of the above embodiment. FIG. 11 is a schematic sectional view showing a cross-sectional shape of the surface of the transparent conductive film in the state that the upper electrode and the lower electrode of the transparent touch panel of the above embodiment are opposed to each other. FIG. 12 is a schematic sectional view showing a cross-sectional shape of the surface of the transparent conductive film in the state of a pen input performed while the upper electrode and the lower electrode of the transparent touch panel of the above embodiment are opposed to each other. FIG. 13 is an atomic force microscope photograph showing crystal grain size of a metallic oxide of the transparent conductive film of the transparent touch panel of the above embodiment of FIG. 2. FIG. 14 is another atomic force microscope photograph showing crystal grain size of a metallic oxide of the transparent conductive film of the transparent touch panel of the above embodiment of the invention. FIG. 15 is a graph showing heightwise variations in the crystal grain size of a metallic oxide of the transparent conductive film in a cross section taken along the line A-B of FIG. 14. The positions of A1, A2, A3, A4, A5, A6 in FIG. 15 correspond to the positions of A1, A2, A3, A4, A5, A6 in FIG. 14, respectively. FIG. 16 is a graph showing heightwise variations in the crystal grain size of a metallic oxide of the transparent conductive film in a cross section taken along the line C-D of FIG. 14. The positions of C1, C2, C3, C4, C5, C6 in FIG. 16 correspond to the positions of C1, C2, C3, C4, C5, C6 in FIG. 14, respectively.

In the figures, reference numeral 1 denotes a transparent conductive film, 2 denotes an input pen, 3 denotes a bus bar, 4 denotes an upper electrode, and 5 denotes a lower electrode. Therefore, as shown in FIGS. 3 and 12, input work is performed by pressing a portion of the surface of the transparent touch panel from the input surface side, for example, from the upper electrode 4 side, with the input pen 2 so that the two electrodes 4, 5 both formed of the transparent conductive film 1 are put into contact and electrically conducting with each other, by which input information is transferred to specified equipment via the bus bar 3.

In the transparent touch panel of this embodiment of the invention, the lower electrode 5 formed of the transparent conductive film 1 provided on the surface of a lower electrode substrate 15, and the upper electrode 4 formed of the transparent conductive film 1 provided on the surface of an upper electrode substrate 14 are stacked so as to be spaced from each other by a multiplicity of spacers 10 as shown in FIGS. 1, 11, and 12. The spacers 10 used are, for example, those having a diameter of 20–100 μm, a height of 4–25 μm, and each interval between the spacers 10 of 1–5 mm. The spacers are normally formed on the surface of either the upper electrode or the lower electrode.

Substrates as the lower electrode substrate and the upper electrode substrate in this embodiment are exemplified by plastic substrates or glass substrates having thermal resistance and superior in transparency. Examples of the plastic substrates used are polycarbonate resin, polyethylene terephthalate resin, polyethersulfone resin, polyacrylate resin, triacetate resin, or the like. The glass substrates have only to be low in hue and not particularly limited.

As the transparent conductive film 1 of this embodiment may be made of a metallic oxide, which is an n-type semiconductor, typified by ATO (antimony oxide/tin oxide), FTO (tin oxide/fluorine dope), ITO (indium oxide/tin oxide), FATO (antimony oxide/tin oxide/fluorine dope), and the like. In particular, ITO is preferable by virtue of its being free from coloring of the transparent conductive film itself and superior in permeability.

The transparent conductive film 1 is so formed that the arithmetic mean roughness (Ra) of the surface shape is within a range of $0.4\ nm \leq Ra \leq 4.0\ nm$ and the root-mean-square roughness (Rms) of the surface shape is within a range of $0.6\ nm \leq Rms \leq 3.0\ nm$. The reason for this is that forming the transparent conductive film 1 like this makes it possible to obtain a film in which crystal grain aggregates are arranged compact as shown in FIG. 1 and yet which has a good smoothness so that a contact area for input operation can promptly be ensured as shown in FIGS. 11 and 12. More specifically, if the arithmetic mean roughness (Ra) is less than 0.4 nm or if the root-mean-square roughness (Rms) is less than 0.6 nm, a considerably dot-like contact results, which is unsuitable for input operation because of less contact area (see FIG. 5 and FIGS. 17 to 19). Also, even if either one of the arithmetic mean roughness (Ra) and the root-mean-square roughness (Rms) is within the foregoing range, proper inputs could not be expected. Further, if the arithmetic mean roughness (Ra) is over 4.0 nm or if the root-mean-square roughness (Rms) is over 3.0 nm, sliding characteristics of the transparent conductive film 1 are adversely affected, undesirably.

Further, preferably, the cross section of grain aggregates forming the surface shape is formed into a trapezoidal or rectangular shape as shown in FIG. 1 by setting the following parameter (Rp/Rmax) which represents the surface shape of the transparent conductive film 1 to 0.55 or less (see FIGS. 15 and 16). The reason of this is that obtaining such a shape makes it possible to ensure a very stable input as well as to obtain a longer life and successful results in terms of sliding characteristics that are essential as a switch.

More specifically, in the transparent touch panel of this embodiment, in the case where, as an example, the transparent conductive film 1 forming at least one of the electrodes is an indium oxide-tin oxide film, the cross section of grain aggregates forming the surface shape is formed into a trapezoidal or rectangular shape as shown in FIG. 1 by obtaining settings that the mean crystal grain size (R) within the plane of the metallic oxide observed at the surface of the film is within a range of $40\ nm \leq R \leq 200\ nm$, the arithmetic mean roughness (Ra) of the surface of the transparent conductive film 1 is within a range of $0.4\ nm \leq Ra \leq 3.0\ nm$, the root-mean-square roughness (Rms) is within a range of $0.6\ nm \leq Rms \leq 2.0\ nm$, and that the parameter (Rp/Rmax) representing the surface shape is 0.55 or less. That is, it is set that $Rp/Rmax \leq 0.55$, where Rp represents the center line depth and Rmax represents the maximum roughness of the surface, both expressed in nm. The center line depth Rp and the maximum roughness Rmax will be described later.

In the case where the transparent conductive film 1 is an indium oxide-tin oxide film as shown above, the reason that the mean crystal grain size (R) within the plane of the metallic oxide observed at the surface of the film is set so as to be distributed within the range of $40\ nm \leq R \leq 200\ nm$ is as follows. That is, if the mean crystal grain size (R) is distributed within a range less than 40 nm, then a light touch input would result in an unstable input; if the mean crystal grain size (R) is distributed within a range over 200 nm, then it is extremely difficult to fabricate a transparent conductive film 1 having such a mean crystal grain size (R). Therefore, by setting the mean crystal grain size (R) to within the range of $40\ nm \leq R \leq 200\ nm$ so that a stable oxide film less in barriers typified by grain boundaries is obtained, the contact resistance upon mutual contact of the transparent conductive films provided on opposing substrates can be reduced so that a stable input can be achieved.

Normally, sputtering process is the mainstream for forming the indium oxide-tin oxide film and is capable of obtaining a film of good crystallinity, where such measures as holding the substrate temperature during film formation at high temperatures or performing annealing process at specified temperatures after the film formation are taken for achieving grain growth. In the above case of the film formation by sputtering process, in order to set the mean crystal grain size (R) within the range of 40 nm≦R≦200 nm as described above, the growth of crystal grains may be accelerated, for example, by setting the substrate temperature during the film formation to 350° C. or by performing an aging process at 150–200° C. for several hours or more after the film formation.

Particularly in the case of an indium oxide-tin oxide film, which is an ITO film formed by the sputtering process as described above, because it has a lower specific resistance, the film needs to be provided as an extremely thin film for applications to touch panels. As a result, the mean grain size also tends to be small, naturally. Therefore, coating process and printing process are not only simpler in engineering-technique but also easier in grain control as well as easier in adjustment of specific resistance, than sputtering process. Furthermore, coating process and printing process are suitable for controlling the surface shape.

For example, in the case of transparent conductive films 1 having a mean crystal grain size (R) around 50 nm or so as shown in FIG. 2 and FIGS. 13 and 14, proper inputs are able to be obtained even with a light touch input. Further, successful results are obtained also with a light touch input after a humidity heat test at 60° C. and a relative humidity of 95% (RH) for 500 hours. In addition, in FIG. 14, the arithmetic mean roughness (Ra) is 0.80 nm, the root-mean-square roughness (Rms) is 1.06 nm. In contrast to this, in FIG. 17 according to the prior art example, the arithmetic mean roughness (Ra) is 0.21 nm and the root-mean-square roughness (Rms) is 0.26 nm in the A-B line portion and 0.28 nm in the C-D line portion. In FIGS. 15, 16, 18, and 19, the vertical axis represents height and the horizontal axis represents distance.

Also, in the case where the mean crystal grain size (R) within the plane observed at the surface of the transparent conductive film is as fine as 10–15 nm, generally, an increase in surface resistance value occurs upon the foregoing humidity heat test, and a considerable increase in occurrence of mis-inputs occurs with light touch inputs. The reason of this could be considered that with a small mean crystal grain size (R), the surface area of the transparent conductive film increases and so the amount of moisture adsorption is large, causing carriers in the transparent conductive film to be removed, with the result that the surface resistance value is increased. It could also be considered that more grain boundaries exist in a transparent conductive film having a smaller mean crystal grain size (R), than in a transparent conductive film having a larger mean crystal grain size (R), where in the case of, for example, indium oxide-tin oxide, since the mean free path of carriers can be considered as about 100 Å, the mobility of carriers lowers due to grain boundary scattering that could normally be neglected, with the result that trouble with light touch inputs is more likely to occur.

Also, in the transparent touch panel of this embodiment, as another example, in the case where a transparent conductive film 1 forming at least one electrode is a fluorine- or antimony-added tin oxide film instead of an indium oxide-tin oxide film, the cross section of grain aggregates forming the surface shape is formed into a trapezoidal or rectangular shape as shown in FIG. 1 by obtaining settings that the mean crystal grain size (R) within the plane of the metallic oxide observed at the surface of the film is within a range of 80 nm≦R≦400 nm, the arithmetic mean roughness (Ra) of the surface of the transparent conductive film 1 is within a range of 0.4 nm≦Ra≦4.0 nm, the root-mean-square roughness (Rms) is within a range of 0.6 nm≦Rms≦3.0 nm, and that the parameter (Rp/Rmax) representing the surface shape is 0.55 or less. That is, it is set that Rp/Rmax≦0.55, where Rp represents the center line depth and Rmax represents the maximum roughness, both expressed in nm. The center line depth Rp and the maximum roughness Rmax will be described later.

In the case where the transparent conductive film 1 is a fluorine- or antimony-added tin oxide film as shown above, the reason that the mean crystal grain size (R) within the plane of the metallic oxide observed at the surface of the film is set so as to be distributed within the range of 80 nm≦R≦400 nm is as follows. That is, if the mean crystal grain size (R) is distributed within a range less than 80 nm, then a light touch input would result in an unstable input; if the mean crystal grain size (R) is distributed within a range over 400 nm, then the transparent conductive film serving as the opposing electrode would be damaged by surface irregularities, thus the transparent conductive film 1 being inferior in sliding durability. Therefore, by setting the mean crystal grain size (R) to within the range of 80 nm≦R≦400 nm so that a crystal-grown, stable oxide film is obtained, the contact resistance upon mutual contact of the transparent conductive films provided on opposing substrates can be reduced so that a stable input can be achieved.

Normally, vapor phase methods typified by CVD process is the mainstream for forming the fluorine- or antimony-added tin oxide film. In the CVD process, the film formation temperature is as high as 450° C.–550° C. and therefore the growth of crystal grains can be controlled so that the mean crystal grain size (R) is set within the range of 80 nm≦R≦400 nm.

Also, in the cases of the above two examples, when the transparent conductive film is formed by film formation with a sol-gel material and by using coating process or printing process, the size of the crystal grains can be controlled so as to fall within the aforementioned range by adjusting the addition amount or dispersibility of various kinds of elements in solution state as well as the free energy of ink and further by taking into consideration drying process and burning conditions.

Figure 20:
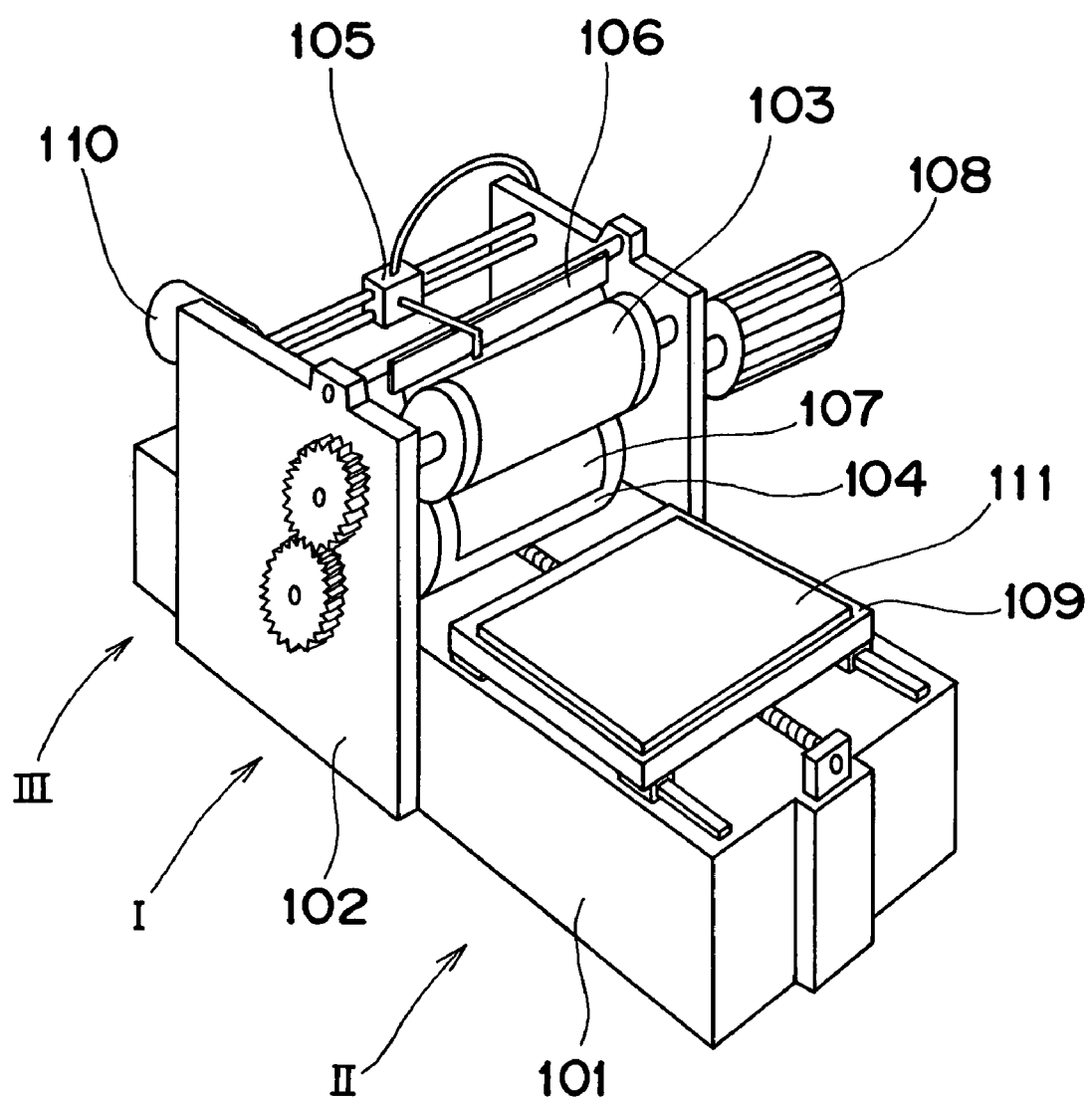
FIG. 20 is a perspective view of a thin film formation apparatus to be used as an example in the case where the transparent conductive film according to the above embodiment is formed by printing process.

For example, when the transparent conductive film is formed by printing process, there is a method in which printing is done with a thin film formation apparatus as shown in Japanese Patent Publication No. 3-11630 (see FIG. 20). This thin film formation apparatus is constructed by: an intaglio roll 103 rotatably supported on a support frame of a base and having a multiplicity of 1.0—several 10 μm deep ink cells on its surface; an ink feeder unit 105 for feeding 1.0–30,000 mPas ink to the surface of the intaglio roll 103; a doctor 106 which is provided at a specified site around the intaglio roll 103 supported on the support frame 102 and which makes a constant amount of ink held within the ink cells by spreading the ink, which has been fed to the intaglio roll 103, over the intaglio roll surface; a print roll 104 which is rotatably supported on the support frame 102 below the intaglio roll 103 and which has a projected portion 107 held in contact with the intaglio roll 103 and moreover which makes the ink in the ink cells on the surface of the intaglio roll 103 transferred to the relief portion 107; a drive unit 108 for synchronously driving into rotation the print roll 104 and the intaglio roll 103 supported on the support frame 102; a platen 109 on which a printing object 111 is placed and which is movable between a printing position I contacting the print roll 104 on the base 101 and retreat positions II, III separated from the print roll 104; a printing object driving unit 110 for moving the platen 109 between the two kinds of printing and retreat positions; and a control unit (not shown) for controlling the rotation of the print roll. 104 as well as the travel of the platen 109 from the retreat positions II, III to the printing position I so that the ink transferred to the projected portion 107 of the print roll 104 is printed to the printing object.

The ink is composed, for example, of at least one kind of compounds represented by an organometallic compound the general formula of which is $M(OH)_x(R—CO—CH_2—CO—R')_y$, where m=X+Y (where M is an element selected from among In, Sn, Sb, B, P, Al, Bi, Si, Ti, Se, Te, Hf, and Zn, R, R' are a substituted allyl group or a substituted alkyl group, m is the valence of M, and X and Y are natural numbers), a solvent, and a stabilizer.

In particular, with the use of an ink in which M in the general formula is indium (In) and tin (Sn) and in which the constituent weight ratio of indium to tin is that 5 wt %≦{Sn/(In+Sn)}×100≦15 wt %, the mean crystal grain size (R) within the foregoing range can be easily obtained, and it is easy to control the arithmetic mean roughness (Ra) and the root-mean-square roughness (Rms) to within the foregoing ranges. In this connection, if the constituent weight ratio of indium to tin is less than 5 wt %, the amount of tin added as a dopant is so low that the generation of carriers serving for electrical conduction could not be expected. That is, the specific resistance of the film would be $1.0×10^{-3}$ Ω·cm or more, the film being unsuitable for use as a touch panel. Meanwhile, if the constituent weight ratio of indium to tin is over 15 wt %, the mean crystal grain size would be 10–30 nm, making it difficult to set the arithmetic mean roughness (Ra) and the root-mean-square roughness (Rms) to within the foregoing ranges, and therefore making it difficult to form the cross section of grain aggregates forming the surface shape of the transparent conductive film into a trapezoidal or rectangular shape.

Also, the mean crystal grain size (R) within the foregoing range can be easily obtained through steps of, after coating or printing with a sol-gel material, performing an initial drying process, then performing an oxidation burning process at a temperature increasing rate of 40° C.–60° C. per minute within a temperature range of 200° C.–400° C., and subsequently performing a reduction burning process. It is also easy to control the arithmetic mean roughness (Ra) and the root-mean-square roughness (Rms) to within the foregoing ranges. In this connection, if the temperature increasing rate is less than 40° C. per minute, the decomposition rate in the film would be so slow that the burning process would proceed with residual organic solvents left, causing the transparent conductive film to be blackened or causing the specific resistance of the transparent conductive film to be $1.0×10^{-3}$ Ω·cm or more, and thus the transparent conductive film being unsuitable for use as a touch panel. Meanwhile, if the temperature increasing rate is over 60° C. per minute, the decomposition rate in the film would be considerably accelerated so as to become a porous film, lacking in film hardness and poor in film properties typified by the humidity test, and thus the transparent conductive film being unsuitable for use as a touch panel.

After film formation into a thin film with the above-described apparatus, and further after, as required, a drying process at 40° C.–100° C. and subsequently an oxidation burning process at about 540° C., a reduction burning process is further performed, by which a transparent conductive film is formed. As a result of forming a transparent conductive film by using such a technique, a film having a mean crystal grain size of 40 nm or more is able to be formed under specified conditions. In this case, the film surface has an Ra of 0.67 nm, an Rms of 0.87 nm and an Rp/Rmax of 0.51 and, as observed by an atomic force microscope, the aggregates of grown crystal grains are cohered so that the film cross section, i.e., the cross section of grain aggregates forming the surface shape shows a trapezoidal shape, and that the transparent conductive film is good at light-input characteristic and superior also in sliding durability. Also after a humidity test at 60° C. and a relative humidity of 95% (RH) for 500 hours, a stable input is obtained.

Also, the stability upon a light touch input can be evaluated by observing a voltage drop due to contact resistance between opposing transparent conductive films 1. As shown in FIGS. 3 and 4, with a voltage of 5 V connected to the upper electrode 4 of the transparent touch panel and with the use of a circuit that gives a load of 10 kΩ to the lower electrode 5, input trouble upon a light touch input can be numerically evaluated by measuring a voltage drop due to contact resistance between the opposing transparent conductive films 1. It is noted that Ev=5−(Ea+Eb+Ec), Ea+Ec≒const., Eb=drop voltage due to contact resistance, and Ev=detected voltage, where Ea and Ec are voltage drops of the upper electrode 4 and the lower electrode 5, respectively.

That is, with respect to the voltage of 5 V applied to the upper electrode 4, the larger the sum of the voltage drops (Ea, Ec) due to the circuit resistance or the like and the voltage drop (Eb) due to contact resistance, the smaller the detected voltage (Ev). Accordingly, the smaller the detected voltage (Ev) is, the more the input trouble occurs.

In the case where ITO is used as the transparent conductive film 1 and the mean crystal grain size (R) is within the range of 40–100 nm, the detected voltage (Ev) is about 4.6 V stable. In contrast to this, in the case where the mean crystal grain size (R) is within a range of 10–15 nm, the detected voltage (Ev) is 4.0–4.2 V unstable as observed. As a result of detailed experiments, it is found that when the detected voltage (Ev) with 5 V applied is about 4.5 V or more, successful inputs are achieved even with light touch inputs.

Also, when a tin oxide film by CVD process is used as an example of the transparent conductive film 1, the mean crystal grain size (R) is distributed within a range of 100–200 nm, where the detected voltage (Ev) is about 4.5 V stable.

Further, in the case where the transparent conductive film 1 forming at least one electrode is an indium oxide-tin oxide film, the reason that the arithmetic mean roughness (Ra) of the surface of the transparent conductive film 1 is within a range of 0.4 nm≦Ra≦3.0 nm and the root-mean-square roughness (Rms) is within a range of 0.6 nm≦Rms≦2.0 nm is as follows. That is, forming the transparent conductive film 1 like this makes it possible to obtain a film in which crystal grain aggregates are arranged compact as shown in FIG. 1 and yet which has a good smoothness so that a contact area for input operation can promptly be ensured as shown in FIGS. 11 and 12. If the arithmetic mean roughness (Ra) is less than 0.4 nm or if the root-mean-square roughness (Rms) is less than 0.6 nm, a considerably dot-like contact results, which is unsuitable for input operation because of less contact area (see FIG. 5 and FIGS. 17 to 19). Even if either one of the arithmetic mean roughness (Ra) and the root-mean-square roughness (Rms) is within the foregoing range, proper inputs could not be expected. Further, it is extremely difficult to fabricate a transparent conductive film 1 having an arithmetic mean roughness (Ra) over 3.0 nm or a root-mean-square roughness (Rms) over 2.0 nm.

Still further, the cross section of the grain aggregates forming the surface shape is formed into a trapezoidal or rectangular shape by a setting that the ratio of center line depth Rp to maximum roughness Rmax, Rp/Rmax, is 0.55 or less (see FIGS. 15 and 16). With such a shape obtained, the transparent conductive film 1 allows a contact area for input operation to be promptly ensured as shown in FIGS. 11 and 12, and is superior in sliding characteristic upon light touch input. Accordingly, a very stable input can be ensured. Furthermore, a longer life and successful results in terms of sliding characteristics that are essential as a switch are obtained.

Also, in the case where the transparent conductive film 1 forming at least one electrode is a fluorine- or antimony-added tin oxide film, the reason that the arithmetic mean roughness (Ra) at the surface is set within the range of 0.4 nm≦Ra≦4.0 nm and the root-mean-square roughness (Rms) is set within the range of 0.6 nm≦Rms≦3.0 nm is as follows. That is, by forming the transparent conductive film 1 like this, the contact area for input operation can promptly be ensured as shown in FIGS. 11 and 12 as in the case of indium oxide-tin oxide. If the arithmetic mean roughness (Ra) is less than 0.4 nm or if the root-mean-square roughness (Rms) is less than 0.6 nm, a considerably dot-like contact results, which is unsuitable for input operation because of less contact area (see FIG. 5). Also, even if either one of the arithmetic mean roughness (Ra) and the root-mean-square roughness (Rms) is within the foregoing range, proper inputs could not be expected. Further, if the arithmetic mean roughness (Ra) is over 4.0 nm or if the root-mean-square roughness (Rms) is over 3.0 nm, sliding characteristics of the transparent conductive film 1 are adversely affected, undesirably.

Still further, the cross section of the grain aggregates forming the surface shape is formed into a trapezoidal or rectangular shape by a setting that the ratio of center line depth Rp to maximum roughness Rmax, Rp/Rmax, is 0.55 or less (see FIGS. 15 and 16). With such a shape obtained, the transparent conductive film 1 allows a contact area for input operation to be promptly ensured as shown in FIGS. 11 and 12, and is superior in sliding characteristic upon light touch input. Accordingly, a very stable input can be ensured.

Other than the methods described above, in order to obtain such a shape, a ground film having a desired shape may also be previously formed on the substrate before forming the transparent conductive film 1.

As to various surface roughness parameters, first, the average line refers to a straight line or curved line which has a geometrical configuration of a measuring plane at a sampling portion of a measuring curve, and which is so set that the square sum of deviations from the line to the measuring curve becomes a minimum. Also, the center line refers to such a straight line that when a straight line parallel to the average line of a roughness curve is drawn, the area surrounded by this line and the roughness curve is equal between two sides of this straight line.

In this connection, given a measuring length (reference length) l portion which is sampled out of the roughness curve along its center line, if the X-axis is given by the center line of this sampled portion and the Y-axis is taken along the direction of longitudinal scale factor, and if the roughness curve is expressed by "y=f(x)" as shown in FIG. 9, then the arithmetic mean roughness (Ra) is calculated by the following equation:

$$Ra = \frac{1}{l}\int_0^l |f(x)| dx$$

Also, another roughness parameter, root-mean-square roughness (Rms), refers to a standard deviation which is determined under the conditions that, given a reference length l portion which is sampled out of the roughness average along the direction of the average value, the X-axis is taken along the direction of the center line of this sampled portion and the Y-axis is taken along the direction of longitudinal scale factor. Both of the arithmetic mean roughness (Ra) and the root-mean-square roughness (Rms) show a tendency that surface roughness increases in proportion to their numerical values, but there is no mathematical relation therebetween that holds generally.

$$Rms = \sqrt{\frac{\sum(Yi-\overline{Y})^2}{N}}$$

where Yi denotes the height of a local crest to a trough bottom line in the sampled portion, $\overline{Y}$ denotes the average of heights of local crest to trough bottom line in the sampled portion, and N denotes the number of intervals between local crests within the reference length l.

More concrete examples of the above embodiment as well as comparative examples for comparison with the examples are shown below.

It is noted that the center line depth (Rp) is represented by a depth from the highest point within the reference length l to the average line or center line as shown in FIG. 10. In addition, in this embodiment, (Rp/Rmax) is used as a parameter to correct any effects of the film depth. Rmax refers to a value which results from a measurement that when a cross-sectional curve is sampled by a reference length l along the direction of the average line and when the cross-sectional curve is sandwiched by two straight lines parallel to the average line, the interval between these two straight lines is measured along the direction of longitudinal scale factor.

Further, the center line depth (Rp) is also significant in discussing the wear resistance associated with the area of the contact portion with respect to planes being equal in Rmax value but different in Rp. That is, with a large value of Rp, the depth from the highest point to the average line or center line becomes large, where a pointed shape is shown; conversely, with a small value of Rp, the cross section of the grain aggregates forming the surface shape shows a shape close to a trapezoidal or rectangular shape.

EXAMPLE 1

On a 20 µm thick polyethylene terephthalate film having an about 5 µm acrylic hard coat, an ITO film is formed as a transparent conductive film by sputtering process at a film formation temperature of 130° C. Further, an aging is performed at a temperature around 150° C., by which a transparent conductive film having a mean crystal grain size (R) distributed within a range of 40–60 nm is fabricated. A 125 μm polyethylene terephthalate film having an about 5 μm acrylic hard coat on its rear surface in advance is laminated on the hard coat surface of the transparent conductive film with an adhesive layer interposed therebetween.

Also, by using, as the lower electrode substrate, a 1.1 mm thick glass dip-coated on both sides with $SiO_2$, and with the substrate temperature set to 250° C., a 15 nm thick ITO film is formed as a transparent conductive film by sputtering process. As a result of observation by an atomic force microscope (SPM-9500 made by Shimadzu Seisakusho Kabushiki Kaisha), the mean crystal grain size (R) is distributed within a range of 40–60 nm.

A transparent touch panel using the above film and the glass as electrodes is fabricated, and an input is made in a lattice shape by loading a polyacetal pen with a total weight of 20 g. As a result, a stable input is able to be achieved without causing line distortions or breaks.

Further, as a result of measuring the voltage upon input operation with 5 V applied to this transparent touch panel, a stable value of 4.6 V is shown.

Furthermore, after the transparent touch panel is subjected to a humidity heat test at 60° C. and a relative humidity of 95% (RH) for 500 hours, a similar lattice input test is performed. As a result, the transparent touch panel shows no changes from the initial state. Also, as a result of performing an input voltage measurement, the transparent touch panel shows a stable value of 4.6 V, with absolutely no changes from the initial value, thus being usable with light touch inputs without any issue.

EXAMPLE 2

A transparent conductive film is formed on a polyethylene terephthalate film in the same way as in Example 1 except that the film formation temperature is set to 100° C. As a result of measuring the arithmetic mean roughness (Ra) of the surface of the transparent conductive film, the arithmetic mean roughness (Ra) is that $0.4\ nm \leq Ra \leq 1.2$ nm, and the root-mean-square roughness (Rms) is 0.8 nm. In addition, the reference length is equal to a cutoff value used, and the evaluation length is a value obtained at 700 nm.

Also, a transparent conductive ink composition in which the ratio of indium to tin has been adjusted to $\{Sn/(Sn+In)\} \times 100 = 20$ wt % is printed on a $SiO_2$-coated 300 mm×300 mm×1.1 mm soda glass substrate by the aforementioned thin film formation system (Angstromer™, In-Line type, made by Nissha Printing Co., Ltd.).

The glass substrate, after preliminarily dried by hot plate, is burned at 540° C. with a conveyor type atmosphere separating oven and subsequently cooled from 540° C. to room temperature in a nitrogen atmosphere containing a trace amount of hydrogen gas within the conveyor type atmosphere separating oven, by which a 10 nm thick transparent conductive film is obtained. As a result of observation with an atomic force microscope by an atomic force microscope (SPM-9500 made by Shimadzu Seisakusho Kabushiki Kaisha), the mean crystal grain size (R) is distributed within a range of 10–30 nm.

Further, as a result of measuring the arithmetic mean roughness (Ra) of the surface of the transparent conductive film, the arithmetic mean roughness (Ra) is that $0.15\ nm \leq Ra \leq 0.29$ nm and the root-mean-square roughness (Rms) is 0.39 nm. In addition, the reference length is equal to a cutoff value used, and the evaluation length is a value obtained at 700 nm.

A transparent touch panel using the above film and the glass as electrodes is fabricated, and an input is made in a lattice shape by loading a polyacetal pen with a total weight of 20 g. As a result, a stable input is able to be achieved without causing line breaks or line distortions.

Further, as a result of measuring the voltage upon input operation with 5 V applied to this transparent touch panel, a stable value of 4.5 V is shown.

Furthermore, after the transparent touch panel is subjected to a humidity heat test at 60° C. and a relative humidity of 95% (RH) for 500 hours, a similar lattice input test is performed and then input voltage is measured. As a result, the transparent touch panel shows an input voltage of 4.5 V, similar to the initial value, thus free from any issues with light touch inputs. Also, as a result of evaluating, with lattice inputs, an input state after a 150000-character continuous input test, a stable lattice is able to be drawn without causing line breaks.

EXAMPLE 3

A transparent conductive film is formed on a polyethylene terephthalate film in the same way as in Example 1 except that the film formation temperature is set to 150° C. and that an aging is performed at 150° C. for several hours. The mean crystal grain size (R) is distributed within a range of 40–100 nm. On the transparent conductive film surface, the arithmetic mean roughness (Ra) is that $1.1\ nm \leq Ra \leq 2.3$ nm and the root-mean-square roughness (Rms) is 0.9 nm. In addition, the reference length is equal to a cutoff value used, and the evaluation length is a value obtained at 700 nm.

Also, a transparent conductive ink composition whose ratio of indium to tin has been adjusted to $\{Sn/(Sn+In)\} \times 100 = 12$ wt % is printed on a $SiO_2$-coated 300 mm×300 mm×1.1 mm soda glass substrate by the aforementioned thin film formation apparatus (Angstromer™, In-Line type, made by Nissha Printing Co., Ltd.).

The glass substrate, after preliminarily dried by hot plate, is burned at 540° C. with a conveyor type atmosphere separating oven and subsequently cooled from 540° C. to room temperature in a nitrogen atmosphere containing a trace amount of hydrogen gas within the conveyor type atmosphere separating oven, by which a 20 nm thick transparent conductive film is obtained. As a result of observation with an atomic force microscope (SPI3600 made by Seiko Denshi Kogyo Kabushiki Kaisha), the mean crystal grain size (R) is distributed within a range of 40–60 nm.

Further, as a result of measuring the arithmetic mean roughness (Ra) of the film surface, the arithmetic mean roughness (Ra) is that $0.4\ nm \leq Ra \leq 0.8$ n=and the root-mean-square roughness (Rms) is 0.70 nm. In addition, the reference length is equal to a cutoff value used, and the evaluation length is a value obtained at 700 nm.

A transparent touch panel using the above film and the glass as electrodes is fabricated, and an input is made in a lattice shape by loading a polyacetal pen with a total weight of 20 g. As a result, a stable input is able to be achieved without causing line breaks or line distortions.

Further, as a result of measuring the voltage upon input operation with 5 V applied to this transparent touch panel, a stable value of 4.65 V is shown.

Furthermore, after the transparent touch panel is subjected to a humidity heat test at 60° C. and a relative humidity of 95% (RH) for 500 hours, a similar lattice input test is performed and then input voltage is measured. As a result, the transparent touch panel shows a value of 4.65 V, similar to the initial value, thus free from any issues with light touch inputs.

EXAMPLE 4

A transparent conductive film is formed on a polyethylene terephthalate film in the same way as in Example 1 except that the film formation temperature is set to 100° C. As a result of measuring the arithmetic mean roughness (Ra) of the surface of the transparent conductive film, the arithmetic mean roughness (Ra) is that 0.4 nm≦Ra≦1.2 nm and the root-mean-square roughness (Rms) is 0.8 nm. In addition, the reference length is equal to a cutoff value used, and the evaluation length is a value obtained at 700 nm.

Also, a transparent conductive ink composition whose ratio of indium to tin has been adjusted to {Sn/(Sn+In)}× 100=10 wt % is printed on a $SiO_2$-coated 300 mm×300 mm×1.1 mm soda glass substrate by the aforementioned thin film formation apparatus (Angstromer™, In-Line type, made by Nissha Printing Co., Ltd.).

The glass substrate, after preliminarily dried by hot plate, is burned at 540° C. with a temperature increasing curve of 55° C./min by using a conveyor type atmosphere separating oven and subsequently cooled from 540° C. to room temperature in a nitrogen atmosphere containing a trace amount of hydrogen gas within the conveyor type atmosphere separating oven, by which a 10 nm thick transparent conductive film is obtained. As a result of observation with an atomic force microscope by an atomic force microscope (SPM-9500 made by Shimadzu Seisakusho Kabushiki Kaisha), the mean crystal grain size (R) is distributed within a range of 40–50 nm.

Further, as a result of measuring the arithmetic mean roughness (Ra) of the surface of the transparent conductive film, the arithmetic mean roughness (Ra) is that 0.4 nm≦Ra≦0.9 nm and the root-mean-square roughness (Rms) is 0.67 nm. In addition, the reference length is equal to a cutoff value used, and the evaluation length is a value obtained at 700 nm. Also, Rp/Rmax is 0.50 and the cross section of the grain aggregates forming the surface shape shows a trapezoidal shape.

A transparent touch panel using the above film and the glass as electrodes is fabricated, and an input is made in a lattice shape by loading a polyacetal pen with a total weight of 20 g. As a result, a stable input is able to be achieved without causing line breaks or line distortions.

Further, as a result of measuring the voltage upon input operation with 5 V applied to this transparent touch panel, a stable value of 4.55 V is shown.

Furthermore, after the transparent touch panel is subjected to a humidity heat test at 60° C. and a relative humidity of 95% (RH) for 500 hours, a similar lattice input test is performed and then input voltage is measured. As a result, the transparent touch panel shows a value of 4.5 V, similar to the initial value, thus free from any issues with light touch inputs. Also, as a result of evaluating, with lattice inputs, an input state after a 150000-character continuous input test, a stable lattice is able to be drawn without causing line breaks.

COMPARATIVE EXAMPLE 1

A transparent conductive film is formed on a polyethylene terephthalate film in the same way as in Example 1 except that the aging process is omitted. As a result, the mean crystal grain size (R) is distributed within a range of 10–20 nm. Also, by using, as the lower electrode substrate, a 1.1 mm thick glass dip-coated on both sides with $SiO_2$, and with the substrate temperature set to 150° C., a 10 nm thick ITO film is formed as a transparent conductive film by sputtering process. As a result of observation by an atomic force microscope (SPI3600 made by Seiko Denshi Kogyo Kabushiki Kaisha), the mean crystal grain size (R) is distributed within a range of 20–30 nm.

A transparent touch panel using the above film and the glass as electrodes is fabricated, and an input is made in a lattice shape by loading a polyacetal pen with a total weight of 20 g. As a result, although there are no line breaks, line distortions occur, so that a stable input is unable to be achieved.

Further, as a result of measuring the voltage upon input operation with 5 V applied to this transparent touch panel, unstable values of 4.3–4.4 V are shown.

Furthermore, after the transparent touch panel is subjected to a humidity heat test at 60° C. and a relative humidity of 95% (RH) for 500 hours, a similar lattice input test is performed. As a result, line distortions are larger as compared with those of the initial state, even line breaks occur, and besides input-disabled places are observed. Further, as a result of measuring input voltage, the transparent touch panel shows values of 4.0–4.3 V, even lower than the initial values, thus unusable with light touch inputs.

COMPARATIVE EXAMPLE 2

A transparent conductive film is formed on a polyethylene terephthalate film in the same way as in Comparative Example 1. As a result, the mean crystal grain size (R) is distributed within a range of 10–20 nm. The arithmetic mean roughness (Ra) of the surface of the transparent conductive film is that 0.1 nm≦Ra≦0.25 nm and the root-mean-square roughness (Rms) is 0.55 nm. In addition, the reference length is equal to a cutoff value used, and the evaluation length is a value obtained at 700 nm.

Also, by using, as the lower electrode substrate, a 1.1 mm thick glass dip-coated on both sides with $SiO_2$, and with the substrate temperature set to 80° C., a 15 nm thick ITO film is formed as a transparent conductive film by sputtering process. As a result of observation by an atomic force microscope (SPI3600 made by Seiko Denshi Kogyo Kabushiki Kaisha), the mean crystal grain size (R) is distributed within a range of 10–15 nm. The arithmetic mean roughness (Ra) of the surface of the transparent conductive film is that 0.1 nm≦Ra≦0.22 nm and the root-mean-square roughness (Rms) is 0.35 nm. In addition, the reference length is equal to a cutoff value used, and the evaluation length is a value obtained at 700 nm.

A transparent touch panel using the above film and the glass as electrodes is fabricated, and voltage upon input operation is measured by loading a polyacetal pen with a total weight of 20 g and with 5 V applied. As a result, unstable values of 4.2–4.3 V are shown.

Furthermore, after the transparent touch panel is subjected to a humidity heat test at 60° C. and a relative humidity of 95% (RH) for 500 hours, a similar lattice input test is performed. As a result, line distortions are larger as compared with those of the initial state, even line breaks occur, and besides input-disabled places are observed. Further, as a result of measuring input voltage, the transparent touch panel shows values of 3.7–4.0 V, even lower than the initial values, thus unusable with light touch inputs. Also, as a result of evaluating, with lattice inputs, an input state after a 150000-character continuous input test, 3.9–4.1 V places are partly detected.

COMPARATIVE EXAMPLE 3

A transparent conductive film is formed on a polyethylene terephthalate film in the same way as in Example 3.

Also, a transparent conductive ink composition is printed on a SiO$_2$-coated 300 mm×300 mm×1.1 mm soda glass substrate by a thin film formation apparatus (Angstromer™, In-Line type, made by Nissha Printing Co., Ltd.).

The glass substrate, after preliminarily dried by hot plate, is burned at 500° C. with a conveyor type atmosphere separating oven and subsequently cooled from 500° C. to room temperature in a nitrogen atmosphere containing a trace amount of hydrogen gas within the conveyor type atmosphere separating oven, by which a 10 nm thick transparent conductive film is obtained. As a result of observation with an atomic force microscope (SPI3600 made by Seiko Denshi Kogyo Kabushiki Kaisha), the mean crystal grain size (R) is distributed within a range of 10–30 nm. Further, as a result of measuring the arithmetic mean roughness (Ra) of the surface of the transparent conductive film, the arithmetic mean roughness (Ra) is that 0.1 nm$\leq$Ra$\leq$0.4 nm and the root-mean-square roughness (Rms) is 0.35 nm. In addition, the reference length is equal to a cutoff value used, and the evaluation length is a value obtained at 700 mm.

A transparent touch panel using the above film and the glass as electrodes is fabricated, and an input is made in a lattice shape by loading a polyacetal pen with a total weight of 20 g. As a result, although there are no line breaks, line distortions occur, so that a stable input is unable to be achieved.

Further, as a result of measuring the voltage upon input operation with 5 V applied to this transparent touch panel, unstable values of 4.3–4.4 V are shown.

Furthermore, after the transparent touch panel is subjected to a humidity heat test at 60° C. and a relative humidity of 95% (RH) for 500 hours, a similar lattice input test is performed. As a result, line distortions are larger as compared with those of the initial state, even line breaks occur, and besides input-disabled places are observed. Further, as a result of measuring input voltage, the transparent touch panel shows values of 4.0–4.3 V, even lower than the initial values, thus unusable with light touch inputs.

The transparent conductive film for use in a transparent touch panel, the transparent touch panel using the transparent conductive film, and a method for fabricating the transparent conductive film according to the present invention are constituted as described above and therefore have the following superior effects.

The transparent conductive film for use in the transparent touch panel according to the first aspect of the invention, is constructed so that the lower electrode and the upper electrode are stacked so as to be spaced from each other by the spacers, the transparent conductive film being provided on the electrode substrate of at least one of the electrodes and thereby forming the electrode, wherein the transparent conductive film has, in its surface shape, the arithmetic mean roughness (Ra) within the range of 0.4 nm$\leq$Ra$\leq$4.0 nm and the root-mean-square roughness (Rms) within the range of 0.6 nm$\leq$Rms$\leq$3.0 nm. Therefore, a film in which crystal grain aggregates are arranged compact and yet which has a good smoothness can be obtained, so that a contact area for input operation can promptly be ensured, thus making the transparent conductive film suitable for light touch inputs.

The transparent conductive film for use in the transparent touch panel according to the second aspect of the invention, is constructed so that the lower electrode and the upper electrode are stacked so as to be spaced from each other by the spacers, the transparent conductive film being provided on the electrode substrate of at least one of the electrodes and thereby forming the electrode, wherein the transparent conductive film is composed of the indium oxide-tin oxide film and the mean crystal grain size (R) within the plane of the metallic oxide observed at the surface of the transparent conductive film is within the range of 40 nm$\leq$R$\leq$200 nm. Therefore, a stable oxide film less in barriers typified by grain boundaries is obtained, and the contact resistance upon mutual contact of the transparent conductive films provided on opposing substrates can be reduced, so that a stable input can be achieved, thus making the transparent conductive film suitable for light touch inputs.

The transparent conductive film for use in the transparent touch panel according to the third aspect of the invention, is constructed so that the lower electrode and the upper electrode are stacked so as to be spaced from each other by the spacers, the transparent conductive film being provided on the electrode substrate of at least one of the electrodes and thereby forming the electrode, wherein the transparent conductive film is composed of the fluorine- or antimony-added tin oxide film and the mean crystal grain size (R) within the plane of the metallic oxide observed at the surface of the transparent conductive film is within the range of 80 nm$\leq$R$\leq$400 nm. Therefore, a crystal-grown, stable oxide film is obtained, and as a result, the contact resistance upon mutual contact of the transparent conductive films provided on opposing substrates can be reduced, so that a stable input can be achieved, making the transparent conductive film suitable for light touch inputs.

The transparent conductive film for use in the transparent touch panel according to the fourth aspect of the invention, in the first or second aspect, wherein the transparent conductive film is composed of the indium oxide-tin oxide film and has, in its surface shape, the arithmetic mean roughness (Ra) within the range of 0.4 nm$\leq$Ra$\leq$3.0 nm and the root-mean-square roughness (Rms) within the range of 0.6 nm$\leq$Rms$\leq$2.0 nm. Therefore, a film in which the crystal grain aggregates are arranged compact and yet which has a good smoothness can be obtained, so that a contact area for input operation can promptly be ensured and that the contact resistance upon light touch input can be reduced, thus making the transparent conductive film suitable for light touch inputs.

The transparent conductive film for use in the transparent touch panel according to the fifth aspect of the invention, in the first or third aspect, is constructed so that the transparent conductive film is composed of the fluorine- or antimony-added tin oxide film and has, in its surface shape, the arithmetic mean roughness (Ra) within the range of 0.4 nm$\leq$Ra$\leq$4.0 nm and the root-mean-square roughness (Rms) within the range of 0.6 nm$\leq$Rms$\leq$3.0 nm. Therefore, a contact area for input operation can promptly be ensured, making the transparent conductive film suitable for light touch inputs.

The transparent conductive film for use in the transparent touch panel according to the sixth aspect of the invention, in any one of the first to fifth aspects, is constructed so that given the center line depth Rp and the maximum roughness Rmax with respect to the surface shape, the parameter (Rp/Rmax) representing the surface shape is set to 0.55 or less, whereby the cross section of the grain aggregates forming the surface shape is formed into the trapezoidal or rectangular shape. Therefore, with such a trapezoidal or rectangular shape obtained, the transparent conductive film allows a contact area for input operation to be promptly ensured and is superior in sliding characteristic upon light touch input. Accordingly, a very stable input can be ensured and the life can be prolonged in terms of sliding characteristics that are essential as a switch.

The transparent conductive film for use in the transparent touch panel according to the seventh aspect of the invention, in any one of the first to sixth aspects, is constructed so that the transparent conductive film is formed by the coating or printing process with the sol-gel material. Therefore, the cross section of the grain aggregates forming the surface shape is formed into the trapezoidal or rectangular shape, and as a result, the transparent conductive film allows a contact area for input operation to be promptly ensured and is superior also in sliding characteristic, thus being suitable for light touch inputs.

The transparent touch panel according to the eighth aspect of the invention, is constructed so that the transparent conductive film in any one of the first to seventh aspects is provided on the electrode substrate of at least one electrode out of the lower electrode and the upper electrode and thereby forming the electrode. Therefore, as to this transparent conductive film, a film in which the crystal grain aggregates are arranged compact and yet which has a good smoothness can be obtained, so that a contact area for input operation can promptly be ensured. Thus, a transparent touch panel superior in light touch inputs can be offered.

The transparent touch panel according to the ninth aspect of the present invention, is constructed so that the transparent conductive film in any one of the first to seventh aspects is provided on each of electrode substrates of both the lower electrode and the upper electrode and thereby forming the electrodes. Therefore, as to this transparent conductive film, a film in which the crystal grain aggregates are arranged compact and yet which has a good smoothness can be obtained, so that a contact area for input operation can promptly be ensured. Thus, a transparent touch panel superior in light touch inputs can be offered.

The method for fabricating the transparent conductive film for use in the transparent touch panel according to the tenth aspect of the invention, is constructed so that the lower electrode and the upper electrode are stacked so as to be spaced from each other by the spacers, the transparent conductive film being provided on the electrode substrate of at least one of the electrodes and thereby forming the electrode, the method comprising: forming the indium oxide-tin oxide film so that the film has, in its surface shape, the arithmetic mean roughness (Ra) within the range of 0.4 nm$\leq$Ra$\leq$3.0 nm and the root-mean-square roughness (Rms) within the range of 0.6 nm$\leq$Rms$\leq$2.0 nm, by the coating or printing process using the sol-gel material, where at least the organometallic compound constituting the sol-gel material is composed of indium and tin and has the constituent weight ratio of indium to tin that 5 wt %$\leq$\{Sn/(In +Sn)\}$\times$100$\leq$15 wt %. Therefore, a transparent conductive film suitable for light touch inputs can be easily obtained.

The method for fabricating the transparent conductive film for use in the transparent touch panel according to the eleventh aspect of the invention, is constructed so that the lower electrode and the upper electrode are stacked so as to be spaced from each other by the spacers, the transparent conductive film being provided on the electrode substrate of at least one of the electrodes and thereby forming the electrode, the method comprising: forming the indium oxide-tin oxide film so that the mean crystal grain size (R) within the plane of the metallic oxide observed at the surface of the film is within the range of 40 nm$\leq$R$\leq$200 nm, by the coating or printing process using the sol-gel material, where at least the organometallic compound constituting the sol-gel material is composed of indium and tin and has a constituent weight ratio of indium to tin that 5 wt %$\leq$\{Sn/(In+Sn)\}$\times$100$\leq$15 wt %. Therefore, a stable transparent conductive film less in barriers typified by grain boundaries can be easily obtained.

The method for fabricating the transparent conductive film for use in the transparent touch panel according to the twelfth aspect of the invention, is constructed so that the lower electrode and the upper electrode are stacked so as to be spaced from each other by the spacers, the transparent conductive film being provided on the electrode substrate of at least one of the electrodes and thereby forming the electrode, the method comprising: after coating or printing with the sol-gel material by the coating or printing process using the sol-gel material, performing the initially drying process; then performing the oxidation burning process at the temperature increasing rate of 40° C.–60° C. per minute within the temperature range of 200° C.–400° C.; and subsequently performing the reduction burning process, thereby forming the indium oxide-tin oxide film so that the film has, in its surface shape, the arithmetic mean roughness (Ra) within the range of 0.4 nm$\leq$Ra$\leq$3.0 nm and the root-mean-square roughness (Rms) within the range of 0.6 nm$\leq$Rms$\leq$2.0 nm. Therefore, a transparent conductive film suitable for light touch inputs can be easily obtained.

The method for fabricating the transparent conductive film for use in the transparent touch panel according to the thirteenth aspect of the invention, is constructed so that the lower electrode and the upper electrode are stacked so as to be spaced from each other by the spacers, the transparent conductive film being provided on the electrode substrate of at least one of the electrodes and thereby forming the electrode, the method comprising: after coating or printing with the sol-gel material by the coating or printing process using the sol-gel material, performing the initially drying process; then performing the oxidation burning process at the temperature increasing rate of 40° C.–60° C. per minute within the temperature range of 200° C.–400° C.; and subsequently performing the reduction burning process, thereby forming the indium oxide-tin oxide film so that the mean crystal grain size (R) within the plane of the metallic oxide observed at the surface of the film is within the range of 40 nm$\leq$R$\leq$200 nm. Therefore, a stable transparent conductive film less in barriers typified by grain boundaries can be easily obtained.

The method for fabricating the transparent conductive film for use in the transparent touch panel according to the fourteenth aspect of the invention, in the tenth or eleventh aspect, is constructed so that in a case where the transparent conductive film is formed by the coating or printing process using the sol-gel material, the method comprising: after coating or printing with the sol-gel material, performing the initially drying process; then performing the oxidation burning process at the temperature increasing rate of 40° C.–60° C. per minute within the temperature range of 200° C.–400° C.; and subsequently performing the reduction burning process, thereby forming the transparent conductive film. Therefore, a stable transparent conductive film which is suitable for light touch inputs and less in barriers typified by grain boundaries can be easily obtained.

The transparent conductive film for use in the transparent touch panel according to the fifteenth aspect of the invention, the film is fabricated by the method for fabricating the transparent conductive film for use in the transparent touch panel in any one of the tenth to fourteenth aspects. Therefore, while the advantage of the method for fabricating the transparent conductive film according to any one of the tenth to fourteenth aspects can be obtained, a transparent conductive film which allows a contact area for input operation to be promptly ensured and which is suitable for light touch inputs can be offered.

Also, in the transparent conductive film for use in the transparent touch panel or the transparent touch panel according to the invention, in the case where the transparent conductive film on at least one substrate is the indium oxide-tin oxide film, and where control is made so that the arithmetic mean roughness (Ra) of the surface of the film is within the range of 0.4 nm≦Ra≦3.0 nm and that the root-mean-square roughness (Rms) is 0.6 nm or more, the contact area can be ensured, thus the transparent conductive film or the transparent touch panel being suitable for light touch inputs.

Also, in the transparent conductive film for use in the transparent touch panel or the transparent touch panel according to the invention, in the case where the transparent conductive film on at least one substrate is the indium oxide-tin oxide film, and where control is made so that the mean crystal grain size (R) within the plane of the metallic oxide observed at the surface of the film is within the range of 40 nm≦R≦200 nm, that the arithmetic mean roughness (Ra) of the surface is within the range of 0.4 nm≦Ra≦3.0 nm, and that the root-mean-square roughness (Rms) is 0.6 nm or more, the contact area can be ensured and the contact resistance upon light touch input operation can be further reduced, thus the transparent conductive film or the transparent touch panel being suitable for light touch inputs.

Also, in the transparent conductive film for use in the transparent touch panel or the transparent touch panel according to the invention, in the case where the transparent conductive film on at least one substrate is the indium oxide-tin oxide film, and where the cross section of the grain aggregates forming the surface shape is controlled so as to be formed into the trapezoidal or rectangular shape with settings that the arithmetic mean roughness (Ra) of the film surface is within the range of 0.4 nm≦Ra≦3.0 nm, that the root-mean-square roughness (Rms) is 0.6 nm or more, and that the parameter representing the surface shape is 0.55 or less, the contact area can be ensured and a superior sliding characteristic upon light touch input operation can be obtained, thus the transparent conductive film or the transparent touch panel being suitable for light touch inputs. In addition, on condition that Rp/Rmax≦0.55, Rp represents the center line depth and Rmax represents the maximum roughness, both expressed in nm.

Also, in the transparent conductive film for use in the transparent touch panel or the transparent touch panel according to the invention, in the case where the transparent conductive film on at least one substrate is the fluorine- or antimony-added tin oxide film, and where control is made so that the mean crystal grain size (R) within the plane of the metallic oxide observed at the surface is 40 nm≦R≦400 nm, the contact resistance Eb upon light touch input operation can be reduced, thus the transparent conductive film or the transparent touch panel being suitable for light touch inputs.

Also, in the transparent conductive film for use in the transparent touch panel or the transparent touch panel according to the invention, in the case where the transparent conductive film on at least one substrate is the fluorine- or antimony-added tin oxide film, and where controlled is made so that the arithmetic mean roughness (Ra) of the film surface is within the range of 0.4 nm≦Ra≦4.0 nm and that the root-mean-square roughness (Rms) is 0.6 nm or more, the contact area can be ensured, thus the transparent conductive film or the transparent touch panel being suitable for light touch inputs.

Also, in the transparent conductive film for use in the transparent touch panel or the transparent touch panel according to the invention, in the case where the transparent conductive film on at least one substrate is the fluorine- or antimony-added tin oxide film, and where control is made so that the mean crystal grain size (R) within the plane of the metallic oxide observed at the film surface is 40 nm≦R≦400 nm, that the arithmetic mean roughness (Ra) of the surface of the transparent conductive film is within the range of 0.4 nm≦Ra≦4.0 nm, and that the root-mean-square roughness (Rms) is 0.6 nm or more, the contact resistance upon light touch input operation can be further reduced, the contact area can be ensured and a good sliding characteristic can be obtained, thus the transparent conductive film or the transparent touch panel being suitable for light touch inputs.

Also, in the transparent conductive film for use in the transparent touch panel or the transparent touch panel according to the invention, in the case where the transparent conductive film on at least one substrate is the fluorine- or antimony-added tin oxide film, and where the cross section of the grain aggregates forming the surface shape is controlled so as to be formed into the trapezoidal or rectangular shape with settings that the mean crystal grain size (R) within the plane of the metallic oxide observed at the film surface is within the range of 40 nm≦R≦300 nm, that the arithmetic mean roughness (Ra) of the surface of the transparent conductive film is within the range of 0.4 nm≦Ra≦4.0 nm, that the root-mean-square roughness (Rms) is 0.6 nm or more, and that the parameter representing the surface shape is 0.55 or less, the contact area upon input operation can promptly be ensured, the contact resistance upon light touch input operation can be further reduced, and a good sliding characteristic upon light touch input operation can be obtained, thus the transparent conductive film or the transparent touch panel being suitable for light touch inputs.

Although the present invention has been fully described in connection with the preferred embodiments thereof with reference to the accompanying drawings, it is to be noted that various changes and modifications are apparent to those skilled in the art. Such changes and modifications are to be understood as included within the scope of the present invention as defined by the appended claims unless they depart therefrom.

The invention claimed is:

1. A method for fabricating a transparent conductive film for use in a transparent touch panel in which a lower electrode and an upper electrode are stacked so as to be spaced from each other by spacers, the transparent conductive film being provided on an electrode substrate of at least one of the electrodes and thereby forming the electrode, the method comprising:

forming an indium oxide-tin oxide film so that the film has, in its surface shape, an arithmetic mean roughness (Ra) within a range of 0.4 nm≦Ra≦3.0 nm and a root-mean-square roughness (Rms) within a range of 0.6 nm≦Rms≦2.0 nm, by a coating or printing process using a sol-gel material, where at least an organometallic compound constituting the sol-gel material is composed of indium and tin and has a constituent weight ratio of indium to tin that 5 wt %≦{Sn/(In+Sn)}×100≦15 wt %.

2. A method for fabricating a transparent conductive film for use in a transparent touch panel according to claim 1, wherein when the transparent conductive film is formed by the coating or printing process using the sol-gel material, the method comprising:

after coating or printing with the sol-gel material, performing an initially drying process; then performing an oxidation burning process at a temperature increasing rate of 40° C.–60° C. per minute within a temperature range of 200° C.–400° C.; and subsequently performing a reduction burning process, thereby forming the transparent conductive film.

3. A method for fabricating a transparent conductive film for use in a transparent touch panel in which a lower electrode and an upper electrode are stacked so as to be spaced from each other by spacers, the transparent conductive film being provided on an electrode substrate of at least one of the electrodes and thereby forming the electrode, the method comprising:

after coating or printing with a sol-gel material by a coating or printing process using the sol-gel material, performing an initially drying process; then performing an oxidation burning process at a temperature increasing rate of 40° C.–60° C. per minute within a temperature range of 200° C.–400° C.; and subsequently performing a reduction burning process, thereby forming an indium oxide-tin oxide film so that the film has, in its surface shape, an arithmetic mean roughness (Ra) within a range of 0.4 nm$\leq$Ra$\leq$3.0 nm and a root-mean-square roughness (Rms) within a range of 0.6 nm$\leq$Rms$\leq$2.0 nm.

* * * * *